US008380507B2

(12) United States Patent
Herman et al.

(10) Patent No.: US 8,380,507 B2
(45) Date of Patent: Feb. 19, 2013

(54) SYSTEMS AND METHODS FOR DETERMINING THE LANGUAGE TO USE FOR SPEECH GENERATED BY A TEXT TO SPEECH ENGINE

(75) Inventors: Kenneth Herman, San Jose, CA (US); Matthew Rogers, Sunnyvale, CA (US); Bryan James, Menlo Park, CA (US)

(73) Assignee: Apple Inc., Cupertino, CA (US)

( * ) Notice: Subject to any disclaimer, the term of this patent is extended or adjusted under 35 U.S.C. 154(b) by 812 days.

(21) Appl. No.: 12/400,427

(22) Filed: Mar. 9, 2009

(65) Prior Publication Data

US 2010/0228549 A1 Sep. 9, 2010

(51) Int. Cl.
*G10L 13/08* (2006.01)

(52) U.S. Cl. ........................................................ 704/260

(58) Field of Classification Search ........................ None
See application file for complete search history.

(56) References Cited

U.S. PATENT DOCUMENTS 4,513,435 A 4/1985 Sakoe et al.
4,974,191 A 11/1990 Amirghodsi et al.
5,128,672 A 7/1992 Kaehler
5,282,265 A 1/1994 Rohra Suda et al.
5,325,462 A 6/1994 Farrett
5,386,556 A 1/1995 Hedin et al.
5,392,419 A 2/1995 Walton
5,434,777 A 7/1995 Luciw
5,479,488 A 12/1995 Lenning et al.
5,490,234 A 2/1996 Narayan
5,548,507 A 8/1996 Martino et al.
5,577,241 A 11/1996 Spencer
5,608,624 A 3/1997 Luciw
5,636,325 A 6/1997 Farrett
5,682,539 A 10/1997 Conrad et al.
5,727,950 A 3/1998 Cook et al.
5,748,974 A 5/1998 Johnson
5,794,050 A 8/1998 Dahlgren et al.

(Continued)

FOREIGN PATENT DOCUMENTS

EP 0 691 023 B1 9/1999
EP 1014277 * 6/2000

(Continued)

OTHER PUBLICATIONS

VoiceOver, http://www.apple.com/accessibility/voiceover/, Feb. 2009, pp. 1-5.

(Continued)

*Primary Examiner* — Talivaldis Ivars Smits

(74) *Attorney, Agent, or Firm* — Morgan, Lewis & Bockius LLP

(57) ABSTRACT

Algorithms for synthesizing speech used to identify media assets are provided. Speech may be selectively synthesized from text strings associated with media assets, where each text string can be associated with a native string language (e.g., the language of the string). When several text strings are associated with at least two distinct languages, a series of rules can be applied to the strings to identify a single voice language to use for synthesizing the speech content from the text strings. In some embodiments, a prioritization scheme can be applied to the text strings to identify the more important text strings. The rules can include, for example, selecting a voice language based on the prioritization scheme, a default language associated with an electronic device, the ability of a voice language to speak text in a different language, or any other suitable rule.

56 Claims, 4 Drawing Sheets

300

320

| Is speakable in? | US English | British English | Irish English | French | ... | Chinese |
|---|---|---|---|---|---|---|
| US English | 1 | 1 | 1 | 1 | ... | 0 |
| British English | 1 | 1 | 1 | 1 | ... | 0 |
| Irish English | 1 | 1 | 1 | 1 | ... | 0 |
| French | 1 | 1 | 1 | 1 | ... | 0 |
| Italian | 1 | 1 | 1 | 1 | ... | 0 |
| German | 1 | 1 | 1 | 0 | ... | 0 |
| Korean | 0 | 0 | 0 | 1 | ... | 0 |
| Japanese | 0 | 0 | 0 | 1 | ... | 1 |
| ... | ... | ... | ... | ... | ... | ... |
| Chinese | 0 | 0 | 0 | 1 | ... | 1 |

310

302

U.S. PATENT DOCUMENTS 5,826,261 A 10/1998 Spencer
5,850,480 A 12/1998 Scanlon
5,850,629 A 12/1998 Holm et al.
5,860,064 A 1/1999 Henton
5,878,393 A 3/1999 Hata et al.
5,878,396 A 3/1999 Henton
5,895,466 A 4/1999 Goldberg et al.
5,899,972 A 5/1999 Miyazawa et al.
5,915,238 A 6/1999 Tjaden
5,915,249 A 6/1999 Spencer
5,924,068 A 7/1999 Richard et al.
5,926,789 A 7/1999 Barbara et al.
5,949,961 A 9/1999 Sharman
5,987,404 A 11/1999 Della Pietra et al.
6,052,656 A 4/2000 Suda et al.
6,076,060 A 6/2000 Lin et al.
6,081,750 A 6/2000 Hoffberg et al.
6,088,731 A 7/2000 Kiraly et al.
6,108,627 A 8/2000 Sabourin
6,122,616 A 9/2000 Henton
6,141,642 A * 10/2000 Oh ................................ 704/260
6,144,938 A 11/2000 Surace et al.
6,161,087 A 12/2000 Wightman et al.
6,163,769 A 12/2000 Acero et al.
6,167,369 A 12/2000 Schulze
6,188,999 B1 2/2001 Moody
6,216,102 B1 4/2001 Martino et al.
6,233,559 B1 5/2001 Balakrishnan
6,243,681 B1 * 6/2001 Guji et al. ..................... 704/260
6,272,456 B1 8/2001 de Campos
6,292,772 B1 9/2001 Kantrowitz
6,317,594 B1 11/2001 Gossman et al.
6,317,831 B1 11/2001 King
6,321,092 B1 11/2001 Fitch et al.
6,334,103 B1 12/2001 Surace et al.
6,385,586 B1 5/2002 Dietz
6,411,932 B1 6/2002 Molnar et al.
6,415,250 B1 7/2002 van den Akker
6,421,672 B1 7/2002 McAllister et al.
6,434,524 B1 8/2002 Weber
6,446,076 B1 9/2002 Burkey et al.
6,453,292 B2 9/2002 Ramaswamy et al.
6,460,015 B1 10/2002 Hetherington et al.
6,477,494 B2 * 11/2002 Hyde-Thomson et al. ... 704/260
6,487,533 B2 * 11/2002 Hyde-Thomson et al. ... 704/260
6,499,013 B1 12/2002 Weber
6,501,937 B1 12/2002 Ho et al.
6,513,063 B1 1/2003 Julia et al.
6,523,061 B1 2/2003 Halverson et al.
6,526,395 B1 2/2003 Morris
6,532,444 B1 3/2003 Weber
6,532,446 B1 3/2003 King
6,598,039 B1 7/2003 Livowsky
6,601,026 B2 7/2003 Appelt et al.
6,615,172 B1 9/2003 Bennett et al.
6,633,846 B1 10/2003 Bennett et al.
6,647,260 B2 11/2003 Dusse et al.
6,650,735 B2 11/2003 Burton et al.
6,665,639 B2 12/2003 Mozer et al.
6,665,640 B1 12/2003 Bennett et al.
6,691,111 B2 2/2004 Lazaridis et al.
6,691,151 B1 2/2004 Cheyer et al.
6,694,297 B2 2/2004 Sato
6,704,698 B1 3/2004 Paulsen, Jr. et al.
6,732,142 B1 5/2004 Bates et al.
6,735,632 B1 5/2004 Kiraly et al.
6,742,021 B1 5/2004 Halverson et al.
6,757,362 B1 6/2004 Cooper et al.
6,757,653 B2 6/2004 Buth et al.
6,757,718 B1 6/2004 Halverson et al.
6,760,700 B2 7/2004 Lewis et al.
6,778,951 B1 8/2004 Contractor
6,792,082 B1 9/2004 Levine
6,794,566 B2 9/2004 Pachet
6,807,574 B1 10/2004 Partovi et al.
6,810,379 B1 10/2004 Vermeulen et al.
6,813,491 B1 11/2004 McKinney
6,813,607 B1 11/2004 Faruquie et al.
6,820,055 B2 11/2004 Saindon et al.
6,832,194 B1 12/2004 Mozer et al.
6,842,767 B1 1/2005 Partovi et al.
6,851,115 B1 2/2005 Cheyer et al.
6,859,931 B1 2/2005 Cheyer et al.
6,865,533 B2 3/2005 Addison et al.
6,895,380 B2 5/2005 Sepe, Jr.
6,895,558 B1 5/2005 Loveland
6,928,614 B1 8/2005 Everhart
6,937,975 B1 8/2005 Elworthy
6,964,023 B2 11/2005 Maes et al.
6,980,949 B2 12/2005 Ford
6,996,531 B2 2/2006 Korall et al.
6,999,927 B2 2/2006 Mozer et al.
7,020,685 B1 3/2006 Chen et al.
7,027,974 B1 4/2006 Busch et al.
7,035,801 B2 4/2006 Jimenez-Feltström
7,036,128 B1 4/2006 Julia et al.
7,039,588 B2 5/2006 Okutani et al.
7,050,977 B1 5/2006 Bennett
7,062,428 B2 6/2006 Hogenhout et al.
7,069,560 B1 6/2006 Cheyer et al.
7,092,887 B2 8/2006 Mozer et al.
7,092,928 B1 8/2006 Elad et al.
7,107,204 B1 9/2006 Liu et al.
7,117,231 B2 10/2006 Fischer et al.
7,127,046 B1 10/2006 Smith et al.
7,136,710 B1 11/2006 Hoffberg et al.
7,136,818 B1 11/2006 Cosatto et al.
7,137,126 B1 11/2006 Coffman et al.
7,139,697 B2 11/2006 Häkkinen et al.
7,139,714 B2 11/2006 Bennett et al.
7,159,174 B2 1/2007 Johnson et al.
7,162,482 B1 1/2007 Dunning
7,177,798 B2 2/2007 Hsu et al.
7,181,388 B2 2/2007 Tian
7,200,550 B2 4/2007 Menezes et al.
7,200,559 B2 4/2007 Wang
7,203,646 B2 4/2007 Bennett
7,216,073 B2 5/2007 Lavi et al.
7,216,080 B2 5/2007 Tsiao et al.
7,225,125 B2 5/2007 Bennett et al.
7,233,790 B2 6/2007 Kjellberg et al.
7,233,904 B2 6/2007 Luisi
7,236,932 B1 6/2007 Grajski
7,266,496 B2 9/2007 Wang et al.
7,277,854 B2 10/2007 Bennett et al.
7,290,039 B1 10/2007 Lisitsa et al.
7,299,033 B2 11/2007 Kjellberg et al.
7,308,408 B1 12/2007 Stifelman et al.
7,310,605 B2 12/2007 Janakiraman et al.
7,324,947 B2 1/2008 Jordan et al.
7,349,953 B2 3/2008 Lisitsa et al.
7,359,851 B2 4/2008 Tong et al.
7,365,260 B2 4/2008 Kawashima
7,376,556 B2 5/2008 Bennett
7,376,645 B2 5/2008 Bernard
7,379,874 B2 5/2008 Schmid et al.
7,386,449 B2 6/2008 Sun et al.
7,392,185 B2 6/2008 Bennett
7,398,209 B2 7/2008 Kennewick et al.
7,403,938 B2 7/2008 Harrison et al.
7,409,337 B1 8/2008 Potter et al.
7,415,100 B2 8/2008 Cooper et al.
7,418,392 B1 8/2008 Mozer et al.
7,426,467 B2 9/2008 Nashida et al.
7,447,635 B1 11/2008 Konopka et al.
7,454,351 B2 11/2008 Jeschke et al.
7,467,164 B2 12/2008 Marsh
7,472,061 B1 12/2008 Alewine et al.
7,475,010 B2 1/2009 Chao
7,477,238 B2 1/2009 Fux et al.
7,483,894 B2 1/2009 Cao
7,487,089 B2 2/2009 Mozer
7,496,498 B2 2/2009 Chu et al.
7,502,738 B2 3/2009 Kennewick et al.
7,522,927 B2 4/2009 Fitch et al.
7,523,108 B2 4/2009 Cao
7,526,466 B2 4/2009 Au 7,539,656 B2 5/2009 Fratkina et al.
7,542,967 B2 6/2009 Hurst-Hiller et al.
7,546,382 B2 6/2009 Healey et al.
7,548,895 B2 6/2009 Pulsipher
7,552,045 B2 6/2009 Barliga et al.
7,555,431 B2 6/2009 Bennett
7,562,007 B2 7/2009 Hwang
7,571,106 B2 8/2009 Cao et al.
7,580,839 B2 8/2009 Tamura et al.
7,599,918 B2 10/2009 Shen et al.
7,620,549 B2 11/2009 Di Cristo et al.
7,624,007 B2 11/2009 Bennett
7,634,409 B2 12/2009 Kennewick et al.
7,640,160 B2 12/2009 Di Cristo et al.
7,647,225 B2 1/2010 Bennett et al.
7,657,424 B2 2/2010 Bennett
7,672,841 B2 3/2010 Bennett
7,676,026 B1 3/2010 Baxter, Jr.
7,676,365 B2 3/2010 Hwang et al.
7,680,649 B2 3/2010 Park
7,684,985 B2 3/2010 Dominach et al.
7,684,991 B2 3/2010 Stohr et al.
7,689,408 B2 3/2010 Chen et al.
7,689,409 B2 * 3/2010 Heinecke .......................... 704/9
7,689,421 B2 3/2010 Li et al.
7,693,720 B2 4/2010 Kennewick et al.
7,698,131 B2 4/2010 Bennett
7,702,500 B2 4/2010 Blaedow
7,702,508 B2 4/2010 Bennett
7,706,510 B2 4/2010 Ng
7,707,027 B2 4/2010 Balchandran et al.
7,707,032 B2 4/2010 Wang et al.
7,707,267 B2 4/2010 Lisitsa et al.
7,711,672 B2 5/2010 Au
7,716,056 B2 5/2010 Weng et al.
7,720,674 B2 5/2010 Kaiser et al.
7,720,683 B1 5/2010 Vermeulen et al.
7,725,307 B2 5/2010 Bennett
7,725,320 B2 5/2010 Bennett
7,725,321 B2 5/2010 Bennett
7,729,904 B2 6/2010 Bennett
7,729,916 B2 6/2010 Coffman et al.
7,734,461 B2 6/2010 Kwak et al.
7,752,152 B2 7/2010 Paek et al.
7,774,204 B2 8/2010 Mozer et al.
7,783,486 B2 8/2010 Rosser et al.
7,801,729 B2 9/2010 Mozer
7,809,570 B2 10/2010 Kennewick et al.
7,809,610 B2 10/2010 Cao
7,818,165 B2 10/2010 Carlgren et al.
7,818,176 B2 10/2010 Freeman et al.
7,822,608 B2 10/2010 Cross, Jr. et al.
7,831,426 B2 11/2010 Bennett
7,831,432 B2 11/2010 Bodin et al.
7,840,400 B2 11/2010 Lavi et al.
7,840,447 B2 11/2010 Kleinrock et al.
7,840,581 B2 11/2010 Ross et al.
7,873,519 B2 1/2011 Bennett
7,873,654 B2 1/2011 Bernard
7,881,936 B2 2/2011 Longé et al.
7,912,702 B2 3/2011 Bennett
7,917,367 B2 3/2011 Di Cristo et al.
7,917,497 B2 3/2011 Harrison et al.
7,920,678 B2 4/2011 Cooper et al.
7,930,168 B2 4/2011 Weng et al.
7,949,529 B2 5/2011 Weider et al.
7,974,844 B2 7/2011 Sumita
7,974,972 B2 7/2011 Cao
7,983,917 B2 7/2011 Kennewick et al.
7,983,919 B2 7/2011 Conkie
7,983,997 B2 7/2011 Allen et al.
7,987,151 B2 7/2011 Schott et al.
8,000,453 B2 8/2011 Cooper et al.
8,005,679 B2 8/2011 Jordan et al.
8,015,006 B2 9/2011 Kennewick et al.
8,019,271 B1 9/2011 Izdepski
8,024,195 B2 9/2011 Mozer et al.
8,036,901 B2 10/2011 Mozer
8,041,570 B2 10/2011 Mirkovic et al.
8,041,611 B2 10/2011 Kleinrock et al.
8,055,708 B2 11/2011 Chitsaz et al.
8,069,046 B2 11/2011 Kennewick et al.
8,073,681 B2 12/2011 Baldwin et al.
8,082,153 B2 12/2011 Coffman et al.
8,095,364 B2 1/2012 Longé et al.
8,099,289 B2 1/2012 Mozer et al.
8,107,401 B2 1/2012 John et al.
8,112,275 B2 2/2012 Kennewick et al.
8,112,280 B2 2/2012 Lu
8,165,886 B1 4/2012 Gagnon et al.
8,195,467 B2 6/2012 Mozer et al.
8,204,238 B2 6/2012 Mozer
2001/0044724 A1 11/2001 Hon et al.
2001/0056342 A1 12/2001 Piehn et al.
2002/0040359 A1 4/2002 Green et al.
2002/0103646 A1 8/2002 Kochanski et al.
2003/0158735 A1 8/2003 Yamada et al.
2004/0006467 A1 1/2004 Anisimovich et al.
2004/0054534 A1 3/2004 Junqua
2004/0054541 A1 3/2004 Kryze et al.
2004/0073428 A1 4/2004 Zlokarnik et al.
2004/0124583 A1 7/2004 Landis
2004/0138869 A1 7/2004 Heinecke
2004/0193398 A1 9/2004 Chu et al.
2004/0252604 A1 12/2004 Johnson et al.
2005/0071332 A1 3/2005 Ortega et al.
2005/0080625 A1 4/2005 Bennett et al.
2005/0119897 A1 6/2005 Bennett et al.
2005/0154578 A1 7/2005 Tong et al.
2005/0187773 A1 * 8/2005 Filoche et al. ................ 704/260
2006/0085187 A1 4/2006 Barquilla
2006/0095848 A1 5/2006 Naik
2006/0122834 A1 6/2006 Bennett
2006/0143007 A1 6/2006 Koh et al.
2006/0168150 A1 7/2006 Naik et al.
2007/0016865 A1 1/2007 Johnson et al.
2007/0055493 A1 3/2007 Lee
2007/0055529 A1 3/2007 Kanevsky et al.
2007/0073541 A1 3/2007 Tian
2007/0088556 A1 4/2007 Andrew
2007/0100602 A1 5/2007 Kim
2007/0100790 A1 5/2007 Cheyer et al.
2007/0118377 A1 5/2007 Badino et al.
2007/0155346 A1 7/2007 Mijatovic et al.
2007/0156410 A1 7/2007 Stohr et al.
2007/0174188 A1 7/2007 Fish
2007/0185917 A1 8/2007 Prahlad et al.
2007/0198273 A1 8/2007 Hennecke
2007/0219777 A1 9/2007 Chu et al.
2007/0260460 A1 11/2007 Hyatt
2007/0282595 A1 12/2007 Tunning et al.
2008/0015864 A1 1/2008 Ross et al.
2008/0021708 A1 1/2008 Bennett et al.
2008/0034032 A1 2/2008 Healey et al.
2008/0052063 A1 2/2008 Bennett et al.
2008/0052077 A1 2/2008 Bennett et al.
2008/0059200 A1 3/2008 Puli
2008/0082576 A1 4/2008 Bodin et al.
2008/0120112 A1 5/2008 Jordan et al.
2008/0140657 A1 6/2008 Azvine et al.
2008/0147408 A1 6/2008 Da Palma et al.
2008/0189099 A1 8/2008 Friedman et al.
2008/0221880 A1 9/2008 Cerra et al.
2008/0221903 A1 9/2008 Kanevsky et al.
2008/0228485 A1 9/2008 Owen
2008/0228496 A1 9/2008 Yu et al.
2008/0235024 A1 9/2008 Goldberg et al.
2008/0247519 A1 10/2008 Abella et al.
2008/0300878 A1 12/2008 Bennett
2008/0312909 A1 12/2008 Hermansen et al.
2009/0006097 A1 1/2009 Etezadi et al.
2009/0006343 A1 1/2009 Platt et al.
2009/0018840 A1 1/2009 Lutz et al.
2009/0030800 A1 1/2009 Grois
2009/0048821 A1 2/2009 Yam et al.
2009/0058823 A1 3/2009 Kocienda
2009/0070114 A1 3/2009 Staszak
2009/0076796 A1 3/2009 Daraselia

| | | | | |
|---|---|---|---|---|
| 2009/0076821 | A1* | 3/2009 | Brenner et al. | 704/260 |
| 2009/0100049 | A1 | 4/2009 | Cao | |
| 2009/0150156 | A1 | 6/2009 | Kennewick et al. | |
| 2009/0157401 | A1 | 6/2009 | Bennett | |
| 2009/0164441 | A1 | 6/2009 | Cheyer | |
| 2009/0171664 | A1 | 7/2009 | Kennewick et al. | |
| 2009/0271176 | A1* | 10/2009 | Bodin et al. | 704/2 |
| 2009/0299745 | A1 | 12/2009 | Kennewick et al. | |
| 2009/0299849 | A1 | 12/2009 | Cao et al. | |
| 2009/0306985 | A1 | 12/2009 | Roberts et al. | |
| 2010/0005081 | A1 | 1/2010 | Bennett | |
| 2010/0023320 | A1 | 1/2010 | Di Cristo et al. | |
| 2010/0036660 | A1 | 2/2010 | Bennett | |
| 2010/0042400 | A1 | 2/2010 | Block et al. | |
| 2010/0082328 | A1* | 4/2010 | Rogers et al. | 704/8 |
| 2010/0082346 | A1* | 4/2010 | Rogers et al. | 704/260 |
| 2010/0082347 | A1* | 4/2010 | Rogers et al. | 704/260 |
| 2010/0082348 | A1* | 4/2010 | Silverman et al. | 704/260 |
| 2010/0082349 | A1* | 4/2010 | Bellegarda et al. | 704/260 |
| 2010/0145700 | A1 | 6/2010 | Kennewick et al. | |
| 2010/0204986 | A1 | 8/2010 | Kennewick et al. | |
| 2010/0217604 | A1 | 8/2010 | Baldwin et al. | |
| 2010/0228540 | A1 | 9/2010 | Bennett | |
| 2010/0235341 | A1 | 9/2010 | Bennett | |
| 2010/0257160 | A1 | 10/2010 | Cao | |
| 2010/0277579 | A1 | 11/2010 | Cho et al. | |
| 2010/0280983 | A1 | 11/2010 | Cho et al. | |
| 2010/0286985 | A1 | 11/2010 | Kennewick et al. | |
| 2010/0299142 | A1 | 11/2010 | Freeman et al. | |
| 2010/0312547 | A1 | 12/2010 | van Os et al. | |
| 2010/0318576 | A1 | 12/2010 | Kim | |
| 2010/0332235 | A1 | 12/2010 | David | |
| 2010/0332348 | A1 | 12/2010 | Cao | |
| 2011/0082688 | A1 | 4/2011 | Kim et al. | |
| 2011/0112827 | A1 | 5/2011 | Kennewick et al. | |
| 2011/0112921 | A1 | 5/2011 | Kennewick et al. | |
| 2011/0119049 | A1 | 5/2011 | Ylonen | |
| 2011/0125540 | A1 | 5/2011 | Jang et al. | |
| 2011/0131036 | A1 | 6/2011 | Di Cristo et al. | |
| 2011/0131045 | A1 | 6/2011 | Cristo et al. | |
| 2011/0144999 | A1 | 6/2011 | Jang et al. | |
| 2011/0161076 | A1 | 6/2011 | Davis et al. | |
| 2011/0175810 | A1 | 7/2011 | Markovic et al. | |
| 2011/0184730 | A1 | 7/2011 | LeBeau et al. | |
| 2011/0218855 | A1 | 9/2011 | Cao et al. | |
| 2011/0231182 | A1 | 9/2011 | Weider et al. | |
| 2011/0231188 | A1 | 9/2011 | Kennewick et al. | |
| 2011/0264643 | A1 | 10/2011 | Cao | |
| 2011/0279368 | A1 | 11/2011 | Klein et al. | |
| 2011/0306426 | A1 | 12/2011 | Novak et al. | |
| 2012/0002820 | A1 | 1/2012 | Leichter | |
| 2012/0016678 | A1 | 1/2012 | Gruber et al. | |
| 2012/0020490 | A1 | 1/2012 | Leichter | |
| 2012/0022787 | A1 | 1/2012 | LeBeau et al. | |
| 2012/0022857 | A1 | 1/2012 | Baldwin et al. | |
| 2012/0022860 | A1 | 1/2012 | Lloyd et al. | |
| 2012/0022868 | A1 | 1/2012 | LeBeau et al. | |
| 2012/0022869 | A1 | 1/2012 | Lloyd et al. | |
| 2012/0022870 | A1 | 1/2012 | Kristjansson et al. | |
| 2012/0022874 | A1 | 1/2012 | Lloyd et al. | |
| 2012/0022876 | A1 | 1/2012 | LeBeau et al. | |
| 2012/0023088 | A1 | 1/2012 | Cheng et al. | |
| 2012/0034904 | A1 | 2/2012 | LeBeau et al. | |
| 2012/0035908 | A1 | 2/2012 | LeBeau et al. | |
| 2012/0035924 | A1 | 2/2012 | Jitkoff et al. | |
| 2012/0035931 | A1 | 2/2012 | LeBeau et al. | |
| 2012/0035932 | A1 | 2/2012 | Jitkoff et al. | |
| 2012/0042343 | A1 | 2/2012 | Laligand et al. | |

FOREIGN PATENT DOCUMENTS

| | | | |
|---|---|---|---|
| EP | 1245023 | A1 | 10/2002 |
| EP | 1 909 263 | B1 | 1/2009 |
| GB | 2402855 | * | 12/2004 |
| JP | 06 019965 | | 1/1994 |
| JP | 2001 125896 | | 5/2001 |
| JP | 2002 024212 | | 1/2002 |
| JP | 2003517158 | A | 5/2003 |
| JP | 2009 036999 | | 2/2009 |
| KR | 10-0776800 | B1 | 11/2007 |
| KR | 10-0810500 | B1 | 3/2008 |
| KR | 10 2008 109322 | A | 12/2008 |
| KR | 10 2009 086805 | A | 8/2009 |
| KR | 10-0920267 | B1 | 10/2009 |
| KR | 10 2011 0113414 | A | 10/2011 |
| WO | WO0106489 | * | 1/2001 |
| WO | WO02/37469 | A2 | 5/2002 |
| WO | WO 2005/034085 | A1 | 4/2005 |
| WO | WO 2006/129967 | A1 | 12/2006 |
| WO | WO 2006/133571 | A1 | 12/2006 |
| WO | WO 2009/009240 | A2 | 1/2009 |
| WO | WO 2011/088053 | A2 | 7/2011 |

OTHER PUBLICATIONS

Alfred App, 2011, http://www.alfredapp.com/, 5 pages.

Ambite, JL., et al., "Design and Implementation of the CALO Query Manager," Copyright© 2006, American Association for Artifical Intelligence, (www.aaai.org), 8 pages.

Ambite, JL., et al., "Integration of Heterogeneous Knowledge Sources in the CALO Query Manager," 2005, The 4th International Conference on Ontologies, DataBases, and Applications of Semantics (ODBASE), Agia Napa, Cyprus, ttp://www.isi.edu/people/ambite/publications/integration_heterogeneous_knowledge_sources_calo_query_manager, 18 pages.

Belvin, R. et al., "Development of the HRL Route Navigation Dialogue System," 2001, In Proceedings of the First International Conference on Human Language Technology Research, Paper, Copyright© HRL Laboratories, LLC, http://citeseerx.ist.psu.edu/viewdoc/summary?doi=10.1.1.10.6538, 5 pages.

Berry, P. M., et al. "PTIME: Personalized Assistance for Calendaring," ACM Transactions on Intelligent Systems and Technologies, vol. 2, No. 4, Article 40, Publication date: Jul. 2011, 40:1-22, 22 pages.

Butcher, M., "EVI arrives in town to go toe-to-toe with Siri," Jan. 23, 2012, http://techcrunch.com/2012/01/23/evi-arrives-in-town-to-go-toe-to-toe-with-siri/, 2 pages.

Chen, Y., "Multimedia Siri Finds and Plays Whatever You Ask for," Feb. 9, 2012, http://www.psfk.com/2012/02/multimedia-siri.html, 9 pages.

Cheyer, A. et al., "Spoken Language and Multimodal Applications for Electronic Realties," © Springer-Verlag London Ltd, Virtual Reality 1999, 3:1-15, 15 pages.

Cutkosky, M. R. et al., "PACT: An Experiment in Integrating Concurrent Engineering Systems," Journal, Computer, vol. 26 Issue 1, Jan. 1993, IEEE Computer Society Press Los Alamitos, CA, USA, http://dl.acm.org/citation.cfm?id=165320, 14 pages.

Elio, R. et al., "On Abstract Task Models and Conversation Policies," http://webdocs.cs.ualberta.ca/~ree/publications/papers2/ATS.AA99.pdf, 10 pages.

Ericsson, S. et al., "Software illustrating a unified approach to multimodality and multilinguality in the in-home domain," Dec. 22, 2006, Talk and Look: Tools for Ambient Linguistic Knowledge, http://www.talk-project.eurice.eu/fileadmin/talk/publications_public/deliverables_public/D1_6.pdf, 127 pages.

Evi, "Meet Evi: the one mobile app that provides solutions for your everyday problems," Feb. 8, 2012, http://www.evi.com/, 3 pages.

Feigenbaum, E., et al., "Computer-assisted Semantic Annotation of Scientific Life Works," 2007, http://tomgruber.org/writing/stanford-cs300.pdf, 22 pages.

Gannes, L., "Alfred App Gives Personalized Restaurant Recommendations," allthingsd.com, Jul. 18, 2011, http://allthingsd.com/20110718/alfred-app-gives-personalized-restaurant-recommendations/, 3 pages.

Gautier, P. O., et al. "Generating Explanations of Device Behavior Using Compositional Modeling and Causal Ordering," 1993, http://citeseerx.ist.psu.edu/viewdoc/summary?doi=10.1.1.42.8394, 9 pages.

Gervasio, M. T., et al., Active Preference Learning for Personalized Calendar Scheduling Assistancae, Copyright© 2005, http://www.ai.sri.com/~gervasio/pubs/gervasio-iui05.pdf, 8 pages.

Glass, A., "Explaining Preference Learning," 2006, http://cs229.stanford.edu/proj2006/Glass-ExplainingPreferenceLearning.pdf, 5 pages.

Gruber, T. R., et al., "An Ontology for Engineering Mathematics," In Jon Doyle, Piero Torasso, & Erik Sandewall, Eds., Fourth International Conference on Principles of Knowledge Representation and Reasoning, Gustav Stresemann Institut, Bonn, Germany, Morgan Kaufmann, 1994, http://www-ksl.stanford.edu/knowledge-sharing/papers/engmath.html, 22 pages.
Gruber, T. R., "A Translation Approach to Portable Ontology Specifications," Knowledge Systems Laboratory, Stanford University, Sep. 1992, Technical Report KSL 92-71, Revised Apr. 1993, 27 pages.
Gruber, T. R., "Automated Knowledge Acquisition for Strategic Knowledge," Knowledge Systems Laboratory, Machine Learning, 4, 293-336 (1989), 44 pages.
Gruber, T. R., "(Avoiding) the Travesty of the Commons," Presentation at NPUC 2006, New Paradigms for User Computing, IBM Almaden Research Center, Jul. 24, 2006. http://tomgruber.org/writing/avoiding-travestry.htm, 52 pages.
Gruber, T. R., "Big Think Small Screen: How semantic computing in the cloud will revolutionize the consumer experience on the phone," Keynote presentation at Web 3.0 conference, Jan. 27, 2010, http://tomgruber.org/writing/web30jan2010.htm, 41 pages.
Gruber, T. R., "Collaborating around Shared Content on the WWW," W3C Workshop on WWW and Collaboration, Cambridge, MA, Sep. 11, 1995, http://www.w3.org/Collaboration/Workshop/Proceedings/P9.html, 1 page.
Gruber, T. R., "Collective Knowledge Systems: Where the Social Web meets the Semantic Web," Web Semantics: Science, Services and Agents on the World Wide Web (2007), doi:10.1016/j.websem.2007.11.011, keynote presentation given at the 5th International Semantic Web Conference, Nov. 7, 2006, 19 pages.
Gruber, T. R., "Where the Social Web meets the Semantic Web," Presentation at the 5th International Semantic Web Conference, Nov. 7, 2006, 38 pages.
Gruber, T. R., "Despite our Best Efforts, Ontologies are not the Problem," AAAI Spring Symposium, Mar. 2008, http://tomgruber.org/writing/aaai-ss08.htm, 40 pages.
Gruber, T. R., "Enterprise Collaboration Management with Intraspect," Intraspect Software, Inc., Instraspect Technical White Paper Jul. 2001, 24 pages.
Gruber, T. R., "Every ontology is a treaty—a social agreement—among people with some common motive in sharing," Interview by Dr. Miltiadis D. Lytras, Official Quarterly Bulletin of AIS Special Interest Group on Semantic Web and Information Systems, vol. 1, Issue 3, 2004, http://www.sigsemis.org 1, 5 pages.
Gruber, T. R., et al., "Generative Design Rationale: Beyond the Record and Replay Paradigm," Knowledge Systems Laboratory, Stanford University, Dec. 1991, Technical Report KSL 92-59, Updated Feb. 1993, 24 pages.
Gruber, T. R., "Helping Organizations Collaborate, Communicate, and Learn," Presentation to NASA Ames Research, Mountain View, CA, Mar. 2003, http://tomgruber.org/writing/organizational-intelligence-talk.htm, 30 pages.
Gruber, T. R., "Intelligence at the Interface: Semantic Technology and the Consumer Internet Experience," Presentation at Semantic Technologies conference (SemTech08), May 20, 2008, http://tomgruber.org/writing.htm, 40 pages.
Gruber, T. R., Interactive Acquisition of Justifications: Learning "Why" by Being Told "What" Knowledge Systems Laboratory, Stanford University, Oct. 1990, Technical Report KSL 91-17, Revised Feb. 1991, 24 pages.
Gruber, T. R., "It Is What It Does: The Pragmatics of Ontology for Knowledge Sharing," (c) 2000, 2003, http://www.cidoc-crm.org/docs/symposium_presentations/gruber_cidoc-ontology-2003.pdf, 21 pages.
Gruber, T. R., et al., "Machine-generated Explanations of Engineering Models: A Compositional Modeling Approach," (1993) In Proc. International Joint Conference on Artificial Intelligence, http://citeseerx.ist.psu.edu/viewdoc/summary?doi=10.1.1.34.930, 7 pages.
Gruber, T. R., "2021: Mass Collaboration and the Really New Economy," TNTY Futures, the newsletter of The Next Twenty Years series, vol. 1, Issue 6, Aug. 2001, http://www.tnty.com/newsletter/futures/archive/v01-05business.html, 5 pages.
Gruber, T. R., et al.,"NIKE: A National Infrastructure for Knowledge Exchange," Oct. 1994, http://www.eit.com/papers/nike/nike.html and nike.ps, 10 pages.
Gruber, T. R., "Ontologies, Web 2.0 and Beyond," Apr. 24, 2007, Ontology Summit 2007, http://tomgruber.org/writing/ontolog-social-web-keynote.pdf, 17 pages.
Gruber, T. R., "Ontology of Folksonomy: A Mash-up of Apples and Oranges," Originally published to the web in 2005, Int'l Journal on Semantic Web & Information Systems, 3(2), 2007, 7 pages.
Gruber, T. R., "Siri, a Virtual Personal Assistant—Bringing Intelligence to the Interface," Jun. 16, 2009, Keynote presentation at Semantic Technologies conference, Jun. 2009. http://tomgruber.org/writing/semtech09.htm, 22 pages.
Gruber, T. R., "TagOntology," Presentation to Tag Camp, www.tagcamp.org, Oct. 29, 2005, 20 pages.
Gruber, T. R., et al., "Toward a Knowledge Medium for Collaborative Product Development," In Artificial Intelligence in Design 1992, from Proceedings of the Second International Conference on Artificial Intelligence in Design, Pittsburgh, USA, Jun. 22-25, 1992, 19 pages.
Gruber, T. R., "Toward principles for the Design of Ontologies Used for Knowledge Sharing," In International Journal Human-Computer Studies 43, p. 907-928, substantial revision of paper presented at the International Workshp on Formal Ontology, Mar. 1993, Padova, Italy, available as Technical Report KSL 93-04, Knowledge Systems Laboratory, Stanford University, further revised Aug. 23, 1993, 23 pages.
Guzzoni, D., et al., "Active, A Platform for Building Intelligent Operating Rooms," Surgetica 2007 Computer-Aided Medical Interventions: tools and applications, pp. 191-198, Paris, 2007, Sauramps Médical, http://Isro.epfl.ch/page-68384-en.html, 8 pages.
Guzzoni, D., et al., "Active, A Tool for Building Intelligent User Interfaces," ASC 2007, Palma de Mallorca, http://Isro.epfl.ch/page-34241.html, 6 pages.
Guzzoni, D., et al., "Modeling Human-Agent Interaction with Active Ontologies," 2007, AAAI Spring Symposium, Interaction Challenges for Intelligent Assistants, Stanford University, Palo Alto, California, 8 pages.
Hardawar, D., "Driving app Waze builds its own Siri for hands-free voice control," Feb. 9, 2012, http://venturebeat.com/2012/02/09/driving-app-waze-builds-its-own-siri-for-hands-free-voice-control/, 4 pages.
Intraspect Software, "The Intraspect Knowledge Management Solution: Technical Overview," http://tomgruber.org/writing/intraspect-whitepaper-1998.pdf, 18 pages.
Julia, L., et al., Un éditeur interactif de tableaux dessinés à main levéee (An Interactive Editor for Hand-Sketched Tables), Traitement du Signal 1995, vol. 12, No. 6, 8 pages. No English Translation Available.
Karp, P. D., "A Generic Knowledge-Base Access Protocol," May 12, 1994, http://lecture.cs.buu.ac.th/~f50353/Document/gfp.pdf, 66 pages.
Lemon, O., et al., "Multithreaded Context for Robust Conversational Interfaces: Context-Sensitive Speech Recognition and Interpretation of Corrective Fragments," Sep. 2004, ACM Transactions on Computer-Human Interaction, vol. 11, No. 3, 27 pages.
Leong, L., et al., "CASIS: A Context-Aware Speech Interface System," IUI'05, Jan. 9-12, 2005, Proceedings of the 10th international conference on Intelligent user interfaces, San Diego, California, USA, 8 pages.
Lieberman, H., et al., "Out of context: Computer systems that adapt to, and learn from, context," 2000, IBM Systems Journal, vol. 39, Nos. 3/4, 2000, 16 pages.
Lin, B., et al., "A Distributed Architecture for Cooperative Spoken Dialogue Agents with Coherent Dialogue State and History," 1999, http://citeseerx.ist.psu.edu/viewdoc/summary?doi=10.1.1.42.272, 4 pages.
McGuire, J., et al., "SHADE: Technology for Knowledge-Based Collaborative Engineering," 1993, Journal of Concurrent Engineering: Applications and Research (CERA), 18 pages.
Milward, D., et al., "D2.2: Dynamic Multimodal Interface Reconfiguration," Talk and Look: Tools for Ambient Linguistic Knowledge, Aug. 8, 2006, http://www.ihmc.us/users/nblaylock/Pubs/Files/talk_d2.2.pdf, 69 pages.

Mitra, P., et al., "A Graph-Oriented Model for Articulation of Ontology Interdependencies," 2000, http://ilpubs.stanford.edu:8090/442/1/2000-20.pdf, 15 pages.
Moran, D. B., et al., "Multimodal User Interfaces in the Open Agent Architecture," Proc. of the 1997 International Conference on Intelligent User Interfaces (IUI97), 8 pages.
Mozer, M., "An Intelligent Environment Must be Adaptive," Mar./Apr. 1999, IEEE Intelligent Systems, 3 pages.
Mühlhaüser, M., "Context Aware Voice User Interfaces for Workflow Support," Darmstadt 2007, http://tuprints.ulb.tu-darmstadt.de/876/1/PhD.pdf, 254 pages.
Naone, E., "TR10: Intelligent Software Assistant," Mar./Apr. 2009, Technology Review, http://www.technologyreview.com/printer_friendly_article.aspx?id=22117, 2 pages.
Neches, R., "Enabling Technology for Knowledge Sharing," Fall 1991, Al Magazine, pp. 37-56, (21 pages).
Nöth, E., et al., "Verbmobil: The Use of Prosody in the Linguistic Components of a Speech Understanding System," IEEE Transactions on Speech and Audio Processing, vol. 8, No. 5, Sep. 2000, 14 pages.
Rice, J., et al., "Monthly Program: Nov. 14, 1995," The San Francisco Bay Area Chapter of ACM SIGCHI, http://www.baychi.org/calendar/19951114/, 2 pages.
Rice, J., et al., "Using the Web Instead of a Window System," Knowledge Systems Laboratory, Stanford University, http://tomgruber.org/writing/ksl-95-69.pdf, 14 pages.
Rivlin, Z., et al., "Maestro: Conductor of Multimedia Analysis Technologies," 1999 SRI International, Communications of the Association for Computing Machinery (CACM), 7 pages.
Sheth, A., et al., "Relationships at the Heart of Semantic Web: Modeling, Discovering, and Exploiting Complex Semantic Relationships," Oct. 13, 2002, Enhancing the Power of the Internet: Studies in Fuzziness and Soft Computing, SpringerVerlag, 38 pages.
Simonite, T., "One Easy Way to Make Siri Smarter," Oct. 18, 2011, Technology Review, http:// www.technologyreview.com/printer_friendly_article.aspx?id=38915, 2 pages.
Stent, A., et al., "The CommandTalk Spoken Dialogue System," 1999, http://acl.ldc.upenn.edu/P/P99/P99-1024.pdf, 8 pages.
Tofel, K., et al., "SpeakTolt: A personal assistant for older iPhones, i Pads," Feb. 9, 2012, http://gigaom.com/apple/speaktoit-siri-for-older-iphones-ipads/, 7 pages.
Tucker, J., "Too lazy to grab your TV remote? Use Siri instead," Nov. 30, 2011, http://www.engadget.com/2011/11/30/too-lazy-to-grab-your-tv-remove-use-siri-instead/, 8 pages.
Tur, G., et al., "The CALO Meeting Speech Recognition and Understanding System," 2008, Proc. IEEE Spoken Language Technology Workshop, 4 pages.
Tur, G., et al., "The-CALO-Meeting-Assistant System," IEEE Transactions on Audio, Speech and Language Processing, vol. 18, No. 6, Aug. 2010, 11 pages.
Vlingo, "Vlingo Launches Voice Enablement Application on Apple App Store," Vlingo press release dated Dec. 3, 2008, 2 pages.
YouTube, "Knowledge Navigator," 5:34 minute video uploaded to YouTube by Knownav on Apr. 29, 2008, http://www.youtube.com/watch?v=QRH8eimU_20on Aug. 3, 2006, 1 page.
YouTube, "Send Text, Listen To and Send E-Mail 'By Voice' www.voiceassist.com," 2:11 minute video uploaded to YouTube by VoiceAssist on Jul. 30, 2009, http://www.youtube.com/watch?v=0tEU61nHHA4, 1 page.
YouTube, "Text'nDrive App Demo—Listen and Reply to your Message by Voice while Driving!," 1:57 minute video uploaded to YouTube by TextnDrive on Apr. 27, 2010, http://www.youtube.com/watch?v=WaGfzoHsAMw, 1 page.
YouTube, "Voice On The Go (BlackBerry)," 2:51 minute video uploaded to YouTube by VoiceOnTheGo on Jul. 27, 2009, http://www.youtube.com/watch?v=pJqpWgQS98w, 1 page.
International Search Report and Written Opinion dated Nov. 29, 2011, received in International Application No. PCT/US2011/20861, which corresponds to U.S. Appl. No. 12/987,982, 15 pages (Thomas Robert Gruber).
Glass, J., et al., "Multilingual Spoken-Language Understanding in the MIT Voyager System," Aug. 1995, http://groups.csail.mit.edu/sls/publications/1995/speechcomm95-voyager.pdf, 29 pages.
Goddeau, D., et al., "A Form-Based Dialogue Manager for Spoken Language Applications," Oct. 1996, http://phasedance.com/pdf/icslp96.pdf, 4 pages.
Goddeau, D., et al., "Galaxy: A Human-Language Interface to On-Line Travel Information," 1994 International Conference on Spoken Language Processing, Sep. 18-22, 1994, Pacific Convention Plaza Yokohama, Japan, 6 pages.
Meng, H., et al., "Wheels: A Conversational System in the Automobile Classified Domain," Oct. 1996, httphttp://citeseerx.ist.psu.edu/viewdoc/summary?doi=10.1.1.16.3022, 4 pages.
Phoenix Solutions, Inc. v. West Interactive Corp., Document 40, Declaration of Christopher Schmandt Regarding the MIT Galaxy System dated Jul. 2, 2010, 162 pages.
Seneff, S., et al., "A New Restaurant Guide Conversational System: Issues in Rapid Prototyping for Specialized Domains," Oct. 1996, citeseerx.ist.psu.edu/viewdoc/download?doi=10.1.1.16 . . . rep . . . , 4 pages.
Vlingo InCar, "Distracted Driving Solution with Vlingo InCar," 2:38 minute video uploaded to YouTube by Vlingo Voice on Oct. 6, 2010, http://www.youtube.com/watch?v=Vqs8XfXxgz4, 2 pages.
Zue, V., "Conversational Interfaces: Advances and Challenges," Sep. 1997, http://www.cs.cmu.edu/~dod/papers/zue97.pdf, 10 pages.
Zue, V. W., "Toward Systems that Understand Spoken Language," Feb. 1994, ARPA Strategic Computing Institute, ©1994 IEEE, 9 pages.
Badino, L., et al., "Language Independent Phoneme Mapping for Foreign TTS," Jun. 14-16, 2004, 5th ISCA Speech Synthesis Workshop, Pittsburgh, PA, 2 pages.
Black, A. W., et al., "Multilingual Text-to-Speech Synthesis," Acoustics, Speech and Signal Processing (ICASSP'04), May 17-21, 2004, Proceedings of the IEEE International Conference, vol. 3, 4 pages.
Davis, P. C., et al., "Stone Soup Translation," 2001, Department of Linguistics, Ohio State University, 11 pages.
Hain, Hu., et al., "The Papageno TTS System," 2006, Siemens AG, Corporate Technology, Munich, Germany, TC-Star Workshop, 6 pages.
Mahedero, J,P.G., et al., "Natural Language Processing of Lyrics," In Proceedings of the 13th annual ACM International Conference on Multimedia (Multimedia '05), Nov. 6-11, 2005, ACM, New York, NY, USA, pp. 475-478.
Moberg, M., Contributions to Multilingual Low-Footprint TTS System for Hand-Held Devices, Doctoral Thesis, Aug. 17, 2007, Tampere University of Technology, 82 pages.
Moberg, M., et al., "Cross-Lingual Phoneme Mapping for Multilingual Synthesis Systems," Oct. 4-8, 2004, Proceedings of the 8th International Conference on Spoken Language Processing, Jeju Island, Korea, Interspeech 2004, 4 pages.
Notice of Allowance dated Oct. 3, 2012, received in U.S. Appl. No. 12/240,404, 21 pages (Rogers).
Notice of Allowance dated Apr. 13, 2012, received in U.S. Appl. No. 12/240,404, 13 pages (Rogers).
Notice of Allowance dated Aug. 3, 2012, received in U.S. Appl. No. 12/240,433, 17 pages (Rogers).
Notice of Allowance dated Apr. 3, 2012, received in U.S. Appl. No. 12/240,433, 9 pages (Rogers).
Notice of Allowance dated Nov. 17, 2011, received in U.S. Appl. No. 12/240,433, 10 pages (Rogers).
Notice of Allowance dated Sep. 27, 2012, received in U.S. Appl. No. 12/240,437, 38 pages (Naik).
Notice of Allowance dated Oct. 2, 2012, received in U.S. Appl. No. 12/240,449, 8 pages (Silverman).
Notice of Allowance dated Jul. 13, 2012, received in U.S. Appl. No. 12/240,449, 21 pages (Silverman).
Final Office Action dated Aug. 30, 2012, received in U.S. Appl. No. 12/240,420, 34 pages (Silverman).
Final Office Action dated Apr. 30, 2012, received in U.S. Appl. No. 12/240,437, 9 pages (Naik).
Final-Office Action dated Aug. 20, 2012, received in U.S. Appl. No. 12/240,458, 25 pages (Bellegarda).
Office Action dated Nov. 14, 2011, received in U.S. Appl. No. 12/240,404, 13 pages (Rogers).
Office Action dated Nov. 1, 2011, received in U.S. Appl. No. 12/240,410, 11 pages (Rogers).

Office Action dated Mar. 28, 2012, received in U.S. Appl. No. 12/240,420, 19 pages (Silverman).
Office Action dated Nov. 25, 2011, received in U.S. Appl. No. 12/240,437, 9 pages (Naik).
Office Action dated Nov. 30, 2011, received in U.S. Appl. No. 12/240,449, 10 pages (Silverman).
Office Action dated Oct. 24, 2011, received in U.S. Appl. No. 12/240,458, 12 pages (Bellegarda).
Penn, G., et al., "Ale for Speech: A Translation Prototype," 1999, Bell Laboratories, 4 pages.
Singh, R., et al., "Automatic Generation of Phone Sets and Lexical Transcriptions," Acoustics, Speech and Signal Processing 2000 (ICASSP'00), Proceedings of the IEEE International Conference, vol. 3, 4 pages.
Wilson, M., "New iPod Shuffle Moves Buttons to Headphones, Adds Text to Speech," Mar. 11, 2009, http:gizmodo.com/5167946/new-ipod-shuffle-moves-buttons-to-headphones-adds-text-to . . . , 3 pages.

* cited by examiner

| Is speakable in? | US English | British English | Irish English | French | ... | Chinese |
|---|---|---|---|---|---|---|
| US English | 1 | 1 | 1 | 1 | ... | 0 |
| British English | 1 | 1 | 1 | 1 | ... | 0 |
| Irish English | 1 | 1 | 1 | 1 | ... | 0 |
| French | 1 | 1 | 1 | 1 | ... | 0 |
| Italian | 1 | 1 | 1 | 1 | ... | 0 |
| German | 1 | 1 | 1 | 0 | ... | 0 |
| Korean | 0 | 0 | 0 | 1 | ... | 0 |
| Japanese | 0 | 0 | 0 | 1 | ... | 1 |
| ... | ... | ... | ... | ... | ... | ... |
| Chinese | 0 | 0 | 0 | 1 | ... | 1 |

SYSTEMS AND METHODS FOR DETERMINING THE LANGUAGE TO USE FOR SPEECH GENERATED BY A TEXT TO SPEECH ENGINE

FIELD OF THE INVENTION

This relates to systems and methods for selecting a language in which to synthesize audible speech from text.

BACKGROUND OF THE DISCLOSURE

Today, many popular electronic devices, such as personal digital assistants ("PDAs") and hand-held media players or portable electronic devices ("PEDs"), are battery powered and include various user interface components. Conventionally, such portable electronic devices include buttons, dials, or touchpads to control the media devices and to allow users to navigate through media assets, including, for example, music, speech, or other audio, movies, photographs, interactive art, text, and media resident on (or accessible through) the media devices, to select media assets to be played or displayed, and/or to set user preferences for use by the media devices. The functionality supported by such portable electronic devices is increasing. At the same time, these media devices continue to get smaller and more portable. Consequently, as such devices get smaller while supporting robust functionality, there are increasing difficulties in providing adequate user interfaces for the portable electronic devices.

Some user interfaces have taken the form of graphical user interfaces or displays which, when coupled with other interface components on the device, allow users to navigate and select media assets and/or set user preferences. However, such graphical user interfaces or displays may be inconvenient, small, or unusable. Other devices have completely done away with a graphical user display.

When devices have no graphical user displays, or displays that are small, poorly illuminated, or unviewable by the user (e.g., an electronic device is in a user's pocket), a user may not be able to graphically identify the audio content being presented via the device. Thus, it may be useful to provide alternate mechanisms for identifying the audio content presented by the device.

SUMMARY OF THE DISCLOSURE

Embodiments of the invention provide audible human speech that may be used to identify media content delivered on a portable electronic device, and that may be combined with the media content such that it is presented during display or playback of the media content. Such speech content may be based on data associated with, and identifying, the media content by recording the identifying information and combining it with the media content. For such speech content to be appealing and useful for a particular user, it may be desirable for it to sound as if it were spoken in a single normal human language, in an accent that is familiar to the user.

To effectively provide such speech to a user, the electronic device may process one or more text strings using a text to speech (TTS) system to synthesize speech and output speech content in the form of audio files reflecting the text strings. The TTS system can include several voices that can be used to synthesize text strings, where each voice can be associated with a particular language. For example, the TTS system can provide one or more voices for each of English, Japanese, Chinese, French, Italian and German speech. Because it may be confusing or undesirable for a user to have speech provided in several languages (e.g., different text strings spoken by different voices), the electronic device may select a single language for particular text strings based on the one or more of languages of the text strings and the languages associated with the electronic device.

The electronic device can use any suitable approach for determining the voice language to use for a particular text string. For example, the electronic device can use a default language associated with the electronic device. As another example, the electronic device can use a language of the text string (e.g., string language). When several text strings are spoken in sequence the electronic device can identify a single language to use for the several text strings. When the several strings are all in the same language, the electronic device can select the single string language for speaking the strings. When the several strings are in a different languages, the electronic device can apply different rules to the strings to determine which of the string languages to use. For example, the electronic device can prioritize the strings and select a language associated with the most important string. As another example, the electronic device can select the default language associated with the device.

In some embodiments, the electronic device can determine whether different voices are able to speak in other languages. For example, the electronic device can determine whether an English voice can speak Chinese, French, Italian and Japanese strings (e.g., an English voice can speak French and Italian, but neither Chinese nor Japanese). When several text strings having different string languages are to be spoken, the electronic device can determine, from the languages of the several text strings, whether one or more of the string languages is able to speak the other string languages. If the electronic device determines that one or more of the string languages can be used to speak the other strings, the electronic device can select a voice in one of the one or more string languages (e.g., the string language associated with the most important of the one or more strings).

BRIEF DESCRIPTION OF THE DRAWINGS

The above and other embodiments of the invention will be apparent upon consideration of the following detailed description, taken in conjunction with accompanying drawings, in which like reference characters refer to like parts throughout, and in which.

DETAILED DESCRIPTION OF THE DISCLOSURE

Figure 1:
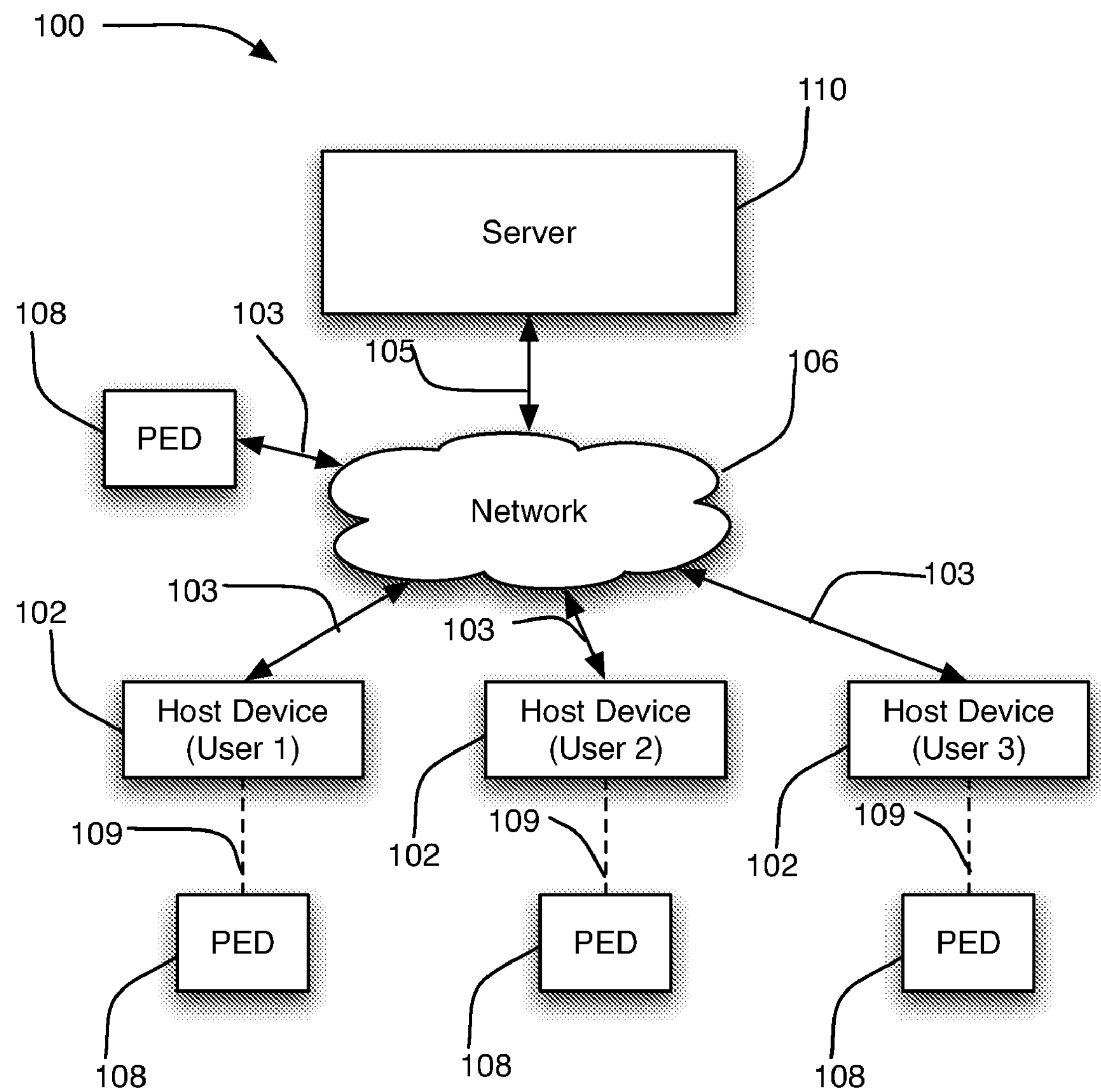
FIG. 1 is a schematic view of an illustrative system that supports text-to-speech synthesis and speech content in accordance with one embodiment of the invention.

This relates to systems and methods for selecting a language in which to provide speech content that identifies a media asset through speech synthesis. The electronic device can provide speech content for any suitable media asset, including for example audio, video or other media items stored on the electronic device or available to the electronic device from a remote source (e.g., streamed media). In some embodiments, a user can direct a host device storing media assets to provide some or all of the media assets to the electronic device (e.g., using iTunes, available from Apple Inc. of Cupertino, Calif.).

Alternatively, a user can retrieve media assets from an on-line store from which the user can download the media assets, or from other sources, such as local copying of a media asset, such as a CD or DVD, a live recording to local memory, a user composition, shared media assets from other sources, radio recordings, or other media assets sources. To identify the media assets, the electronic device can provide speech content based on text strings related to the media assets. The text strings can include any suitable information related to media assets, and be generated from metadata associated with the media assets. For example, the text strings can include strings for the artist, title, album, genre, year, description, lyrics, composer, personal preference rating, playlist, or other information for the media asset. In some embodiments, the text strings can result from processed metadata to remove or replace non-alphabetical characters of the metadata with alphabetical characters (e.g., replace "U2" with "You Two").

Speech content can include audio clips resulting from the synthesis of text using a TTS system, such as the system described below. The speech content can be incorporated as part of the media asset (e.g., within the same file), or stored as a separate but related file. The user can receive the speech content using any suitable approach, including for example with the media asset from the source of the media asset. As another example, the user can direct a server, host device or an electronic device to create speech content for specific media assets and provide the speech content to the electronic device.

To generate speech content from text strings, the text to speech system can apply a voice to the text strings. The text to speech system can include several available voices each associated with different languages, dialects, or accents. For example, the system can include a voice for British English, American English, Canadian English, as well as voices for other languages and dialects in the other languages. Each voice can include several phonemes defining the basic sounds of the language of the voice, which can vary based on the language or accent of the voice (e.g., the phoneme for a short "o" sound is different in British English, American English, and Australian English). To generate speech content with a particular voice, the TTS synthesis system can process a text string to identify specific letters or combinations of letters associated with phonemes in the voice. The system can then combine the phonemes for the identified letters of the text string in the order of the letters, pausing to reflect punctuation or different words. The audio output provided by the system can be supplied to the user as the speech content for the text strings.

While each voice may be associated with a particular language or accent, a particular voice may also be able to speak text originating from a different language. For example, an English voice may be suitable for speaking text strings of words from other European languages, but not for speaking words of Asian languages (e.g., the English phonemes cannot apply to text strings of Asian languages). As another example, a Chinese voice may be suitable for speaking text strings in Korean and Spanish, but not Italian. The electronic device can include or access a database or table indicating, for each voice, whether particular languages are speakable by the voices. A language can be deemed speakable by a particular voice when any suitable condition is met, such as a particular amount of words being understandable (e.g., 90% of words are understandable), or that the voice output includes meaningful sounds (e.g., to ensure that phonemes of a particular voice can be applied text strings of a different language).

When a user directs the electronic device to provide speech content for several text strings, the electronic device can select a voice (e.g., a language) and apply the voice to the several text strings. If the several text strings are all in the same language (e.g., an artist name, track title and track title are all in the same language), the electronic device can use the string language as the voice language for the speech.

In some embodiments, the electronic device can instead or in addition include a default language specific to the device or to an application operating on the device. For example, the electronic device can be associated with a default language set up in the electronic device operating system. As another example, the electronic device can include a language associated with one or more applications. Using the default language, the electronic device can generate speech content from several text strings (e.g., text strings all having the same language).

If the several text strings do not all have the same language, however, the electronic device may apply one or more rules to the text strings to determine which language to use for speech content. The rules can include, for example, comparing the languages of the text strings and the default language of the device. In some embodiments, the electronic device can provide an ordering or prioritization for several text strings to speak. For example, the electronic device can assign different priorities to text strings based on the relative importance of their content to the user. In one implementation, for example, the electronic device can determine that text strings providing the title of media can be more important (and thus have a higher priority) than text strings providing the name of the artist or composer of the media. Using the prioritization information, the electronic device can select the language of the most important or relevant text string. In some embodiments, the electronic device can instead or in addition compare the languages of the text strings to determine which, if any of the text string languages, are usable for speaking the languages of the other text strings. The electronic device can then select the highest priority string language capable of speaking the other text string languages. If no language is capable of speaking all of the string languages, the electronic device can revert to the default language of the device, a predetermined language, or the string language that can speak the largest number of text strings.

Any suitable system can be used to generate speech content from text strings. FIG. 1 is a schematic view of an illustrative system that supports text-to-speech synthesis and speech content in accordance with one embodiment of the invention. Media system 100 may include several host devices 102 and server 110 connected via network 106. Each host device 102 may be associated with a user and coupled to one or more portable electronic devices ("PEDs") 108. PED 108 may be coupled directly or indirectly to the network 106.

The user of host device 102 may access server 110 through network 106. Upon accessing server 110, the user may be able to acquire digital media assets from server 110 and request that such media be provided to host device 102. Here, the user can request the digital media assets in order to purchase, preview, or otherwise obtain limited rights to them.

Server 110 can receive and process user requests for media assets, as well as include a database in which several media assets are stored, along with synthesized speech content identifying these assets. A media asset and speech content associated with that particular asset may be stored as part of or otherwise associated with the same file. In some embodiments, server 110 may include a rendering processor or circuitry for synthesizing speech from the data (e.g., metadata) associated with and identifying the media asset. The rendering processors or circuitry can include one or more render engines as part of rendering servers, for example as described in commonly assigned U.S. patent application Ser. No. 12/240,458, filed Sep. 29, 2008 (the '459 application), which is incorporated herein by reference in its entirety. Server 110 can include one or more rendering processors.

Host device 102 may interconnect with server 110 via network 106. Network 106 may be, for example, a data network, such as a global computer network (e.g., the World Wide Web). Network 106 may be a wireless network, a wired network, or any combination of the same. Any suitable circuitry, device, system, or combination of these (e.g., a wireless communications infrastructure including communications towers and telecommunications servers) operative to create a communications network may be used to create network 106. Network 106 may be capable of providing communications using any suitable communications protocol. In some embodiments, network 106 may support, for example, traditional telephone lines, cable television, Wi-Fi™ (e.g., an 802.11 protocol), Ethernet, Bluetooth™, radio frequency systems (e.g., 900 MHz, 2.4 GHz, and 5.6 GHz communication systems), infrared, transmission control protocol/internet protocol ("TCP/IP") (e.g., any of the protocols used in each of the TCP/IP layers), hypertext transfer protocol ("HTTP"), file transfer protocol ("FTP"), real-time transport protocol ("RTP"), real-time streaming protocol ("RTSP"), secure shell protocol ("SSH"), any other communications protocol, or any combination thereof.

In some embodiments of the invention, network 106 may support protocols used by wireless and cellular telephones and personal e-mail devices (e.g., an iPhone™ available by Apple Inc. of Cupertino, Calif.). Such protocols can include, for example, GSM, GSM plus EDGE, CDMA, quadband, and other cellular protocols. In another example, a long range communications protocol can include Wi-Fi™ and protocols for placing or receiving calls using voice-over-internet protocols ("VOIP") or local area network ("LAN") protocols. In other embodiments, network 106 may support protocols used in wired telephone networks. Host devices 102 and server 110 may connect to network 106 through a wired and/or wireless manner using bidirectional communications paths 103 and 105.

Portable electronic device 108 may be coupled to host device 102 in order to provide digital media assets that are present on host device 102 to portable electronic device 108. Portable electronic device 108 can couple to host device 102 over link 109. Link 109 may be a wired link or a wireless link. In certain embodiments, portable electronic device 108 may be a portable media player. The portable media player may be battery-powered and handheld and may be able to play music and/or video content. For example, portable electronic device 108 may be a media player such as any personal digital assistant ("PDA"), music player (e.g., an iPod™ Shuffle, an iPod™ Nano, or an iPod™ Touch available by Apple Inc. of Cupertino, Calif.), a cellular telephone (e.g., an iPhone™), a landline telephone, a personal e-mail or messaging device, or combinations thereof. In some embodiments, electronic device 108 can instead or in addition include some or all of the text-to-speech synthesizing circuitry and functionality of server 110, such that the speech content generation process can take place entirely or in part on electronic device 108.

Host device 102 may be any communications and processing device that is capable of storing media that may be accessed through portable electronic device 108. For example, host device 102 may be a desktop computer, a laptop computer, a personal computer, or a pocket-sized computer. In some embodiments, host device 102 can instead or in addition include some or all of the text-to-speech synthesizing circuitry and functionality of server 110, such that the speech content generation process can take place on host device 102, electronic device 108, server 110, or two or more of these (e.g., shared between host device 102 and server 110).

A user of portable electronic device 108 can request speech content for a digital media asset from sever 110, host device 102, or any other suitable device. The user may do so using iTunes™ available from Apple Inc., or any other software that may be run on host device 102 and that can communicate user requests to server 110 through network 106 using links 103 and 105. In doing so, the request that is communicated may include metadata associated with the desired media asset and from which speech content may be synthesized. Alternatively, the user can merely request from host device 102 or server 110 speech content associated with the media asset. Such a request may be in the form of an explicit request for speech content or may be automatically triggered by a user playing or performing another operation on a media asset that is already stored on personal electronic device 108. In particular, a request can be generated for speech content associated with each media item available for playback by a personal electronic device.

After receiving the request for speech content from personal electronic device 108, the appropriate text-to-speech processing component (e.g., server 110 or host device 102) can process the one or more text strings of the request to apply a voice to the strings. In particular, the electronic device can process and normalize text strings to prepare the strings for synthesis. The processing step can include, for example, identifying and replacing non-alphabetical characters in a text string (e.g., numeric characters and punctuation symbols, such as in "U2" and "P!nk"), parsing the text string into different words or phonemes, or any other suitable process for generating a text string for which speech content can be provided. The processing or normalizing step can include any of the steps or processes described in the '458 application.

Once the text strings have been processed and normalized, the text-to-speech processing component can determine the appropriate language for the speech content generated from the text strings. In some embodiments, each personal electronic device can be associated with a default language. The default language can be determined from an operating system or device setting (e.g., an initial setting when a user sets up the device), an application setting (e.g., a default language of a current application), or any other setting of the device defining a default language. The text-to-speech processing component can then use the default language for all speech content.

Figure 2:
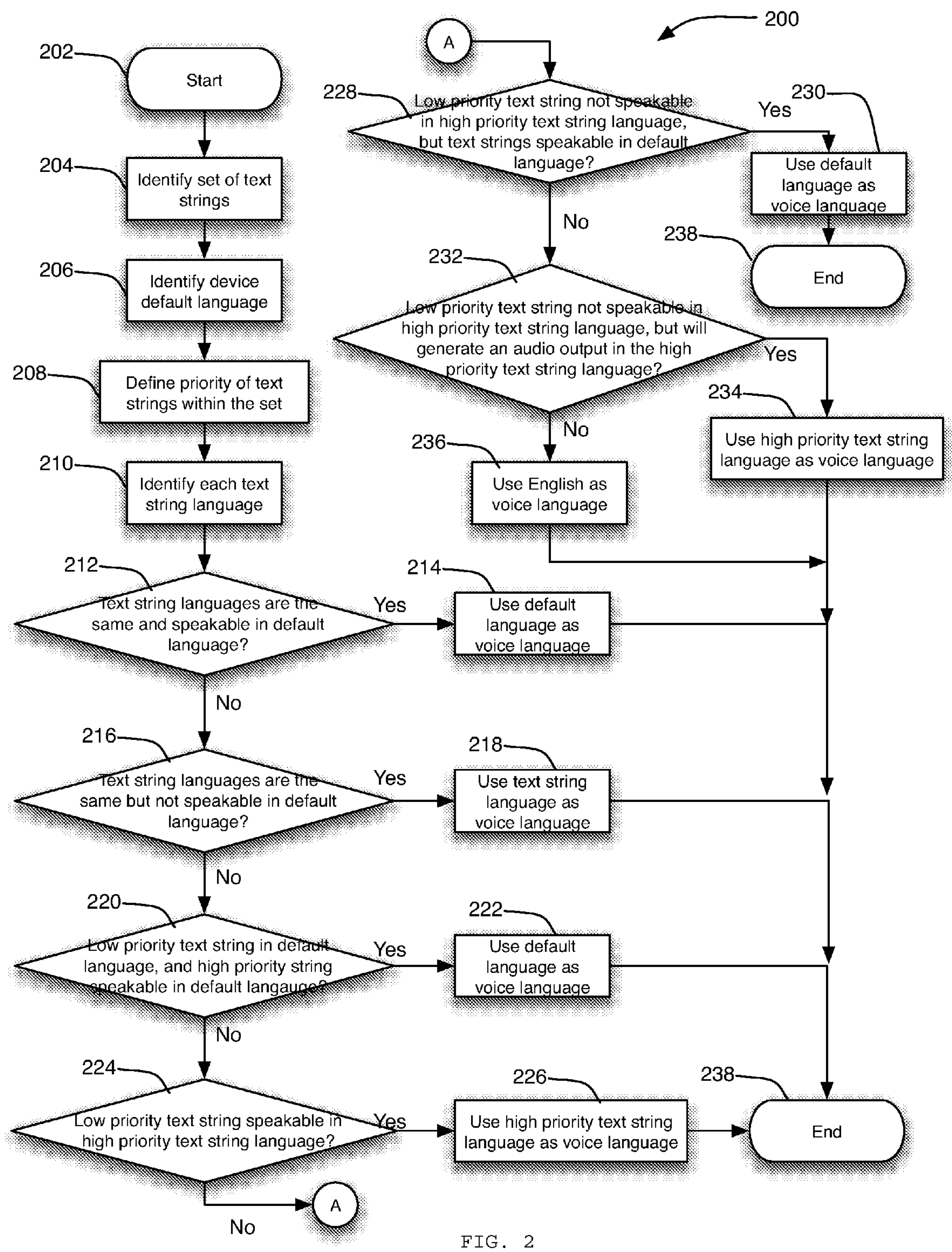
FIG. 2 is a flowchart of an illustrative process for identifying the voice language to apply for particular text strings in accordance with one embodiment of the invention.

Instead or in addition, the speech content can be provided in a language related to the text string language. For example, the text-to-speech processing component can apply a voice language other than the default language to the text strings. The electronic device can define any suitable rules or criteria for determining which language to use for one or more text strings. FIG. 2 is a flowchart of an illustrative process for identifying the voice language to apply for particular text strings in accordance with one embodiment of the invention. Process 200 can begin at step 202. At step 204, the processing component can identify a set of text strings for which speech content is to be provided. For example, the processing component can identify a series of metadata strings identifying media available for playback by a personal electronic device. The text strings can be grouped by sets, where each set identifies particular data. In some embodiments, different text strings can be repeated in different sets, for example when two artists use the same title for a song or album, or when an artist's media is used in a compilation. The voice used for speech content based on a particular text string can be related to the particular set of text strings used, and may change based on the identified set of text strings. In some embodiments, the identified text strings can include more strings than those for which speech content will be provided. For example, the identified set of text strings can include some or all of the metadata associated with media content (e.g., also include year, genre, description and lyrics). The additional text strings may serve, for example, for more precisely determining the language of the text strings for which speech content is to be provided.

At step 206, the electronic device can identify a default language of a personal electronic device. For example, the personal electronic device can provide an indication of the default language with the request for speech content. As another example, the processing component can deduct the default language from geographic information related to the personal electronic device (e.g., geographic location associated with a media store used by the device). At step 208, the processing component can prioritize each text string of the set identified at step 204. For example, the processing component can assign priority values based on the metadata tag of each text string. In one implementation, a title and album name of a media item can have a higher priority than an artist name when speech content is provided for both the title and album, and the artist name. The processing component can use any suitable prioritization scheme, including for example assigning specific values (e.g., integer values) to each text string, associating tiers to text strings (e.g., high and low tiers), or any other suitable approach. In some embodiments, the processing scheme can limit the number of prioritization levels (e.g., three levels, with any suitable number of strings associated with each level).

At step 210, the processing component can identify a language associated with each text string of the identified set. Each text string of the set can be associated with a particular string language, or each word within a string can have a particular word language. Although the following discussion will describe the language in the context of a string language, it will be understood that any subset of the set of strings can be associated with a particular language. The processing component can use any suitable approach to determine the language of each of the text strings of the identified set. For example, the processing component can separate each text string into distinct words (e.g., by detecting certain characters that are predefined as boundary points, such as a space or "_" character), and determine whether each word is in vocabulary, for example in a table or database that includes a list of words, unigrams, N-grams (e.g., a sequence of words or characters having a length N, where N is an integer), character sets or ranges, etc., known in all known languages. As another example, the processing component can instead or in addition perform an N-gram analysis at the character level for the words in the text string (e.g., determine the probability of occurrence of the N-grams that pertain to a word may be determined in each known language). As still another example, the processing component can instead or in addition determine the probability of occurrence of each of the identified words in each known language. These and other approaches for determining the text string languages are described in the '459 application, which is incorporated by reference herein in its entirety.

At step 212, the electronic device can determine whether the languages of the text strings for which speech content is to be provided are the same and whether the text string language is speakable in the default language. A first language can be deemed to be speakable in a second language when speech content generated using a voice in the second language applied to a text string in the first language provides an audible output that satisfies particular criteria. The criteria can include, for example a percentage of words that are understandable by a speaker of the first language (e.g., determined using voice analysis or survey by volunteers), an acceptable mapping of phonemes between the first and second languages, an audible output, or any other suitable criteria. The processing component can generate or access a table or database indicating whether a first language is speakable in a second language (e.g., table 300, FIG. 3, discussed below). The table or database can be stored in the same device as the processing component, or in a distinct device accessible to the processing component.

Figure 3:
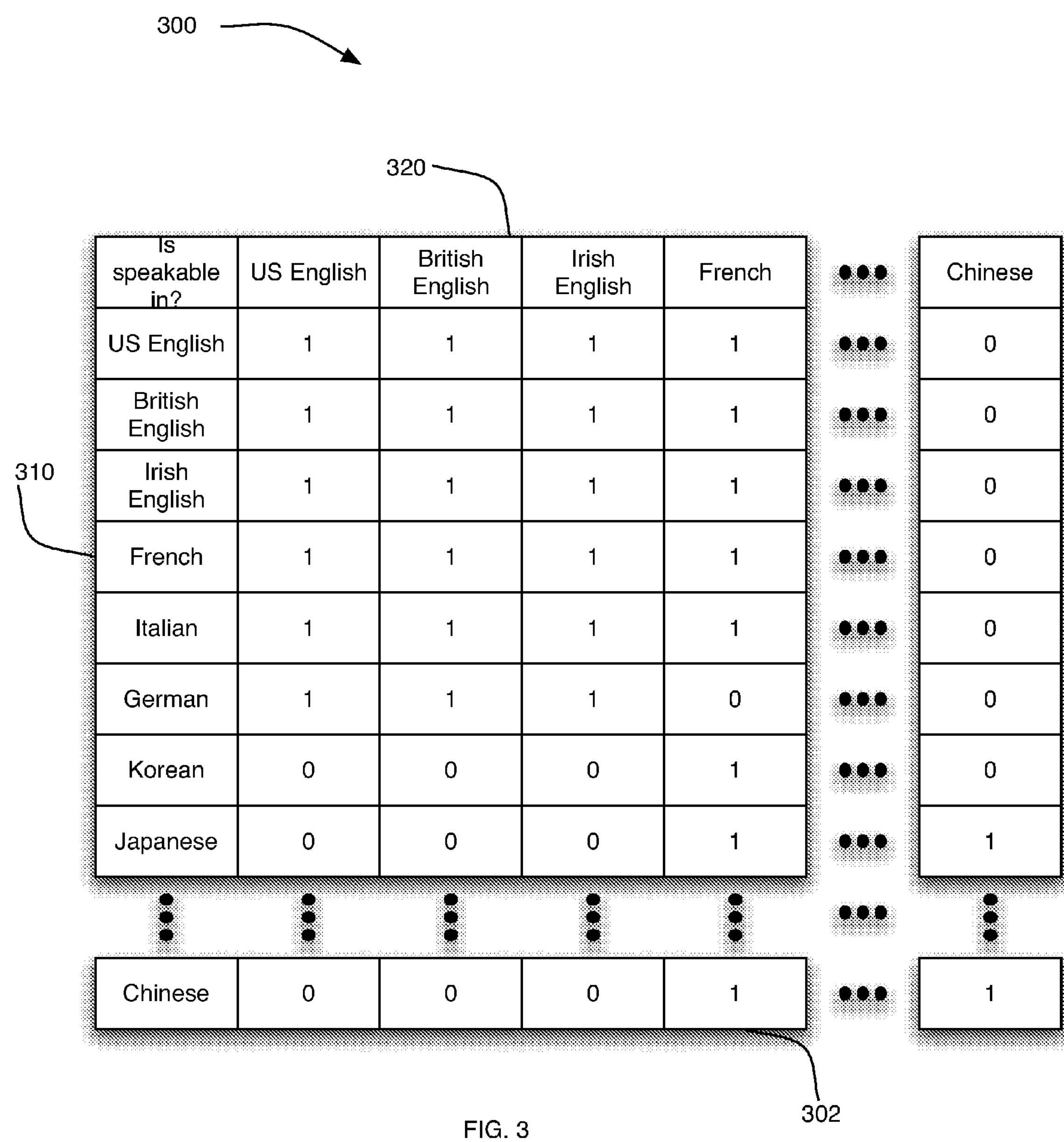
FIG. 3 is a schematic view of an illustrative speakable table in accordance with one embodiment of the invention.

FIG. 3 is a schematic view of an illustrative speakable table in accordance with one embodiment of the invention. Table 300 can include rows 310 and columns 320 of languages (and accents within a language). Each cell 302 of table 300 can include one of two values (e.g., 0 or 1, or yes or no) that indicate whether the language of the corresponding row is speakable in the language of the corresponding column. For example, as shown in table 300, Italian is speakable in French, Japanese is speakable in British English, but Chinese is not speakable in Irish English.

Returning to FIG. 2, if the processing component determines that the languages of the text strings for which speech content is to be provided are the same and that the text string language is speakable in the default language, process 200 can move to step 214.

At step 214, the processing component can use the default language as the voice language for generating speech content for the identified set of text strings. For example, one or more phonemes corresponding to the normalized text of the text stings may be obtained in the default language. A phoneme is a minimal sound unit of speech that, when contrasted with another phoneme, affects the naming of words in a particular language. It is typically the smallest unit of sound that, when contrasted with another phoneme, affects the naming of words in a language. For example, the sound of the character "r" in the words "red," "bring," or "round" in English is a phoneme. A more detailed discussion of the application of phoneme mapping for generating speech content is described in the '458 application, previously incorporated by reference herein. Process 200 can then end at step 238.

If, at step 212, the processing component instead determines that either the text string languages are not that same or that the text string languages are not speakable in the default language, process 200 can move to step 216. At step 216, the processing component can determine whether the text string languages are the same but not speakable in the default language. The processing component can use any suitable approach to determine whether the text string language is speakable in the default language, including for example determining from a lookup table (e.g., table 300, FIG. 3). If the processing component determines that the text string languages are the same but not speakable in the default language, process 200 can move to step 218. At step 218, the processing component can use the text string language common to the set of text strings to generate speech content. For example, the processing component can apply phonemes associated with the text string language to the text strings. Process 200 can then end at step 238.

If, at step 216, the processing component instead determines that the text string languages are not the same, process 200 can move to step 220. At step 220, the processing component can determine whether a low priority text string is in the default language, and whether a high priority text string is speakable in the default language. For example, the processing component can determine whether an artist name is in the default language (e.g., English) and whether a title is in a language that is speakable in the default language (e.g., French). The processing component can use any suitable approach to determine whether the high priority string language is speakable in the default language, including for example determining from a lookup table (e.g., table 300, FIG. 3). If the processing component determines that the low priority string is in the default language, and that the high priority string is speakable in the default language, process 200 can move to step 222. At step 222, the processing component can use the default language to generate speech content. For example, the processing component can apply phonemes associated with the default language to the text strings. Process 200 can then end at step 238.

If, at step 220, the processing component instead determines that the low priority text string is not in the default language, or that the high priority string is not speakable in the default language, process 200 can move to step 224. At step 224, the processing component can determine whether a low priority text string is speakable in the language of a high priority text string. For example, the processing component can determine whether an artist name (e.g., an English text string) is speakable in the language of the title (e.g., French). The processing component can use any suitable approach to determine whether the low priority string language is speakable in the high priority string language, including for example determining from a lookup table (e.g., table 300, FIG. 3). If the processing component determines that the low priority string is speakable in the high priority string language, process 200 can move to step 226. At step 226, the processing component can use the high priority text string language to generate speech content. For example, the processing component can apply phonemes associated with the high priority test string language to the text strings. Process 200 can then end at step 238.

If, at step 224, the processing component instead determines that the low priority text string is not speakable in the high priority string language, process 200 can move to step 228. At step 228, the processing component can determine whether a low priority text string is not speakable in the language of a high priority text string, but both the low and high priority strings are speakable in the default language. For example, the processing component can determine that an artist name (e.g., a Dutch text string) is not speakable in the language of a title (e.g., Italian), but that both text strings are speakable in the default language (e.g., French). As described above, the processing component can use any suitable approach to determine whether the text strings are speakable in the default string language, including for example determining from several lookups using a lookup table (e.g., one lookup per text string language). If the processing component determines that the low priority string is not speakable in the high priority string language, but all of the text strings are speakable in the default language, process 200 can move to step 230. At step 230, the processing component can use the default language to generate speech content. For example, the processing component can apply phonemes associated with the default language to the text strings. Process 200 can then end at step 238.

If, at step 228, the processing component instead determines that the low priority text string is not speakable in the high priority string language and the text strings are not speakable in the default language, process 200 can move to step 232. At step 232, the processing component can determine whether a low priority text string is not speakable in the language of a high priority text string, but applying the high priority text string language to will provide an audible output. For example, the processing component can determine that an artist name, for example a Korean text string, is not speakable in the language of a title, for example Dutch, but that applying Dutch phonemes to the Korean artist name will provide an audible output. The processing component can include a secondary table or database indicating whether applying phonemes from a first language to a second language provides an audible output, or a second entry for each cell of a primary speakable table (e.g., table 300, FIG. 3). If the processing component determines that applying the high priority text string language to the low priority text string provides an audible output, process 200 can move to step 234. At step 234, the processing component can use the high priority text string language to generate speech content. Process 200 can then end at step 238.

If, at step 232, the processing component instead determines that applying the high priority text string language to the low priority text string provides no audible output, process 200 can move to step 236. At step 236, the processing component can use English as the voice language. Alternatively, the processing component can use any other arbitrary language as a fallback when all other rules described above fail. In some embodiments, the language of step 236 can be selected to maximize the chance of providing adequate speech content. For example, the processing component can select a language associated with a column having a large number of "speakable" entries in a speakable table (e.g., table 300, FIG. 3). Process 200 can then end at step 238.

It will be noted that the order of the steps of process 200 is merely exemplary, and that the order in which each of the rules are applied to a set of text strings can change. For example, the order of the rules of steps 220 and 224 can be reversed.

Instead of or in addition to providing speech content describing currently played back media, the electronic device can provide audio messages when errors are detected. Such error messages, can include, for example, indicating to a user that an incorrect headset is being used (e.g., a headset with insufficient functionality such as no input mechanism), or that media should be added to the device in a particular manner (e.g., using iTunes available from Apple Inc.). In particular, if the electronic device does not include a display, audio error messages may be one of the only mechanisms by which to provide an indication of the error to the user. The error messages can be provided to the user in any language, including for example in the default language or in a language associated with a host device, server, or other device. In some embodiments, the error message can be provided in a language set by an application (e.g., iTunes) or an operating system (e.g., the host device operating system). The error messages can be generated as speech content from predefined error text strings, for example in a manner similar to the speech content generated for identifying media items that are played back.

Figure 4:
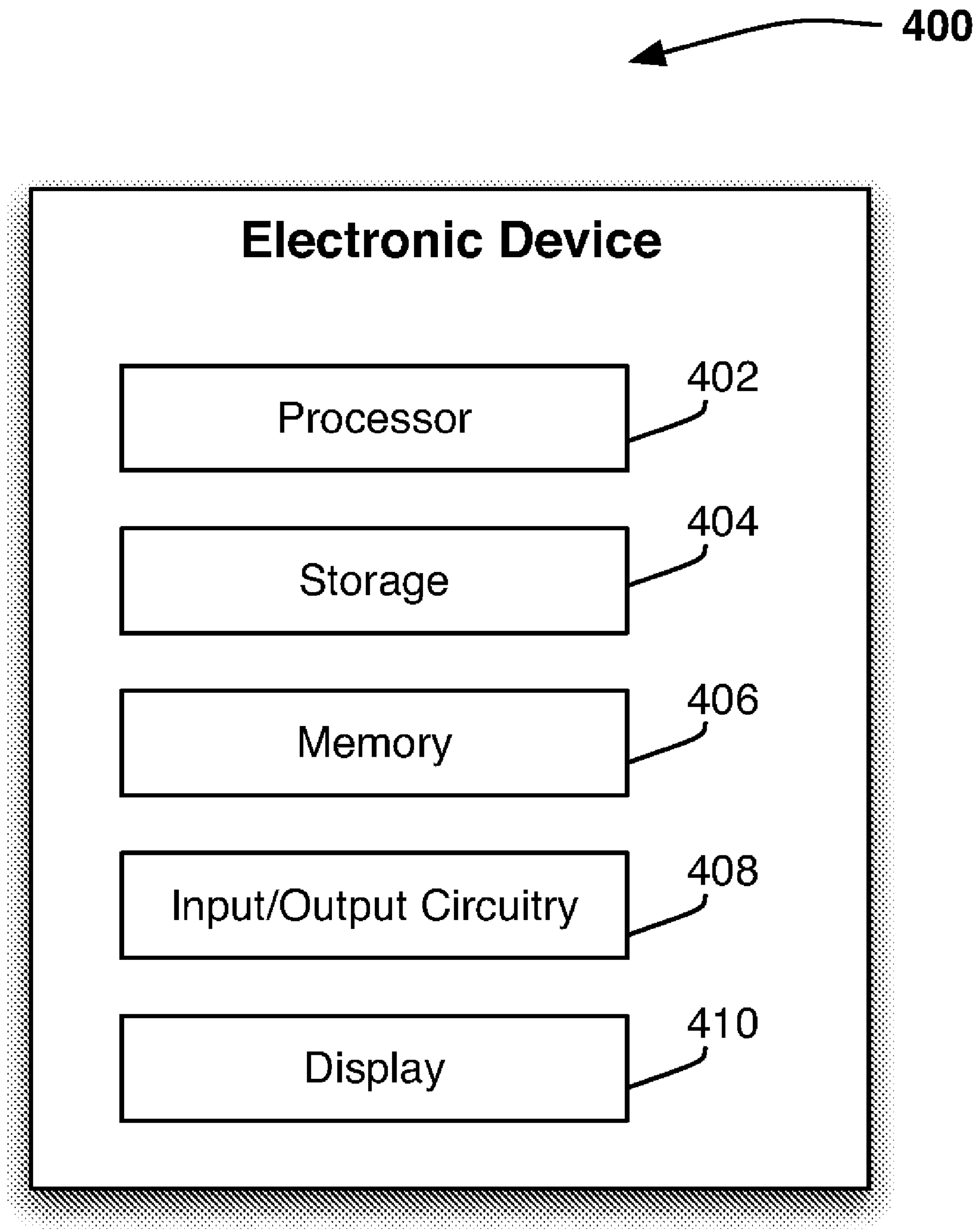
FIG. 4 is a schematic view of an illustrative electronic device for providing speech content to a user in accordance with one embodiment of the invention.

FIG. 4 is a schematic view of an illustrative electronic device for providing speech content to a user in accordance with one embodiment of the invention. Electronic device 400 can include any suitable type of electronic device operative to provide audio to a user. For example, electronic device 400 can include a media player such as an iPod® available by Apple Inc., of Cupertino, Calif., a cellular telephone, a personal e-mail or messaging device (e.g., a Blackberry® or a Sidekick®), an iPhone® available from Apple Inc., pocket-sized personal computers, personal digital assistants (PDAs), a laptop computer, a music recorder, a video recorder, a camera, radios, medical equipment, and any other portable electronic device capable of being moved by the user. The electronic device can be coupled to communications systems to access remote sources of information, such as remote databases (e.g., the Internet) or host devices (e.g., a desktop computer).

Electronic device 400 can include a processor or control circuitry 402, storage 404, memory 406 input/output circuitry 408, and display 410 as typically found in an electronic device of the type of electronic device 400. In some embodiments, one or more of electronic device components 400 can be combined or omitted (e.g., combine storage 404 and memory 406), or electronic device 400 can include other components not combined or included in those shown in FIG. 4 (e.g., communications circuitry, motion detection or sensing components, or positioning circuitry), or several instances of the components shown in FIG. 4. For the sake of simplicity, only one of each of the components is shown in FIG. 4.

Accordingly, it is emphasized that the invention is not limited to the explicitly disclosed systems and methods, but is intended to include variations to and modifications thereof which are within the spirit of the following claims.

What is claimed is:

1. A method for synthesizing speech content based on a plurality of text strings, the method implemented by at least one computing device having at least one processor and at least one program stored in memory, the method comprising:

identifying languages associated with each of the plurality of strings;

distinguishing at least two different identified languages; and applying a series of rules to the plurality of text strings to select a single language for generating the speech content for the plurality of text strings.

2. The method of claim 1, further comprising:

assigning a priority to each of the plurality of text strings; and selecting a language associated with a high priority text string for generating the speech content.

3. The method of claim 2, further comprising:

identifying a default language associated with an electronic device providing the speech content;

determining that the identified languages are speakable in the default language; and selecting the default language for generating the speech content.

4. The method of claim 3, wherein determining further comprises:

determining whether a minimum amount of speech content generated in the default language from a particular text string in a language other than the default language is understandable.

5. The method of claim 2, further comprising:

determining that the identified language of a low priority text string is speakable in the language of a high priority text string; and generating the speech content using the language of the high priority text string.

6. The method of claim 2, further comprising:

determining that the identified language of a low priority text string is not speakable in the language of a high priority text string; and generating the speech content using a default language associated with an electronic device providing the speech content.

7. The method of claim 6, further comprising:

determining that the low priority text string is not speakable in the default language; and generating the speech content using the language of the high priority text string, wherein the speech content associated with the low priority text string comprises unintelligible audio output.

8. The method of claim 7, further comprising:

determining that the speech content generated using the high priority text language applied to the low priority text string comprises no audio output; and generating the speech content using an arbitrary language.

9. An electronic device having at least one processor and memory storing at least one program for execution by the at least one processor, the at least one program including instructions for:

identifying languages associated with each of the plurality of strings;

distinguishing at least two different identified languages; and applying a series of rules to the plurality of text strings to select a single language for generating the speech content for the plurality of text strings.

10. The electronic device of claim 9, the at least one program further comprising instructions for:

assigning a priority to each of the plurality of text strings; and selecting a language associated with a high priority text string for generating the speech content.

11. The electronic device of claim 10, the at least one program further comprising instructions for:

identifying a default language associated with an electronic device providing the speech content;

determining that the identified languages are speakable in the default language; and selecting the default language for generating the speech content.

12. The electronic device of claim 11, the at least one program further comprising instructions for:

determining whether a minimum amount of speech content generated in the default language from a particular text string in a language other than the default language is understandable.

13. The electronic device of claim 10, the at least one program further comprising instructions for:

determining that the identified language of a low priority text string is speakable in the language of a high priority text string; and generating the speech content using the language of the high priority text string.

14. The electronic device of claim 10, the at least one program further comprising instructions for:

determining that the identified language of a low priority text string is not speakable in the language of a high priority text string; and generating the speech content using a default language associated with an electronic device providing the speech content.

15. The electronic device of claim 14, the at least one program further comprising instructions for:

determining that the low priority text string is not speakable in the default language; and generating the speech content using the language of the high priority text string, wherein the speech content associated with the low priority text string comprises unintelligible audio output.

16. The electronic device of claim 15, the at least one program further comprising instructions for:

determining that the speech content generated using the high priority text language applied to the low priority text string comprises no audio output; and generating the speech content using an arbitrary language.

17. Computer readable media for synthesizing speech content based on a plurality of text strings, the computer readable media comprising computer readable instructions recorded thereon for:

identifying languages associated with each of the plurality of strings;

distinguishing at least two different identified languages; and applying a series of rules to the plurality of text strings to select a single language for generating the speech content for the plurality of text strings.

18. The computer readable media of claim 17, further comprising additional computer readable instructions recorded thereon for:

assigning a priority to each of the plurality of text strings; and selecting a language associated with a high priority text string for generating the speech content.

19. The computer readable media of claim 18, further comprising additional computer readable instructions recorded thereon for:

identifying a default language associated with an electronic device providing the speech content;

determining that the identified languages are speakable in the default language; and selecting the default language for generating the speech content.

20. The computer readable media of claim 19, further comprising additional computer readable instructions recorded thereon for:

determining whether a minimum amount of speech content generated in the default language from a particular text string in a language other than the default language is understandable.

21. A host device operative to provide speech content to an electronic device, comprising:

communications circuitry operative to receive:

a set of text strings for which speech content is requested; and a default language associated with the electronic device; and a processor operative to:

identify a title text string from the received set of text strings, wherein the title text string is associated with a title text string language;

identify an artist text string from the received set of text strings, wherein the artist text string is associated with an artist text string language;

determine that at least two of the title text string language, album text string language, and default language are different; and select one of the title text string language, album text string language, and default language for generating speech content for the title text string and album text string.

22. The host device of claim 21, wherein the processor is further operative to:

determine that the title text string language and the album text string language are the same;

determine that the title text string language is speakable in the default language; and generate the speech content using the default language.

23. The host device of claim 21, wherein the processor is further operative to:

determine that the title text string language and the album text string language are the same;

determine that the title text string language is not speakable in the default language; and generate the speech content using the title text string language.

24. The host device of claim 21, wherein the processor is further operative to:

determine that the artist text string language and the default language are the same;

determine that the title text string language is speakable in the default language; and generate the speech content using the default language.

25. The host device of claim 21, wherein the processor is further operative to:

determine that the artist text string language is speakable in the title text string language; and generate the speech content using the title text string language.

26. The host device of claim 21, wherein the processor is further operative to:

determine that the artist text string language is not speakable in the title text string language;

determine that the artist text string language and the title text string language are speakable in the default language; and generate the speech content using the default language.

27. The host device of claim 21, wherein the processor is further operative to:

determine that the artist text string language is not speakable in the title text string language;

determine that speech content generated using the title text string language for the artist text string generates an audible output; and generate the speech content using the title text string language.

28. The host device of claim 21, wherein the processor is further operative to:

determine that the artist text string language is not speakable in the title text string language;

determine that speech content generated using the title text string language for the artist text string does not generate an audible output; and generate the speech content using an arbitrary language.

29. A method for providing speech content, the method implemented by at least one computing device having at least one processor and at least one program stored in memory, the method comprising:

receiving a set of text strings for which speech content is requested;

receiving a default language associated with the electronic device;

identifying a title text string from the received set of text strings, wherein the title text string is associated with a title text string language;

identifying an artist text string from the received set of text strings, wherein the artist text string is associated with an artist text string language;

determining that at least two of the title text string language, album text string language, and default language are different; and selecting one of the title text string language, album text string language, and default language for generating speech content for the title text string and album text string.

30. The method of claim 29, further comprising:

determining that the title text string language and the album text string language are the same;

determining that the title text string language is speakable in the default language; and generating the speech content using the default language.

31. The method of claim 29, further comprising:

determining that the title text string language and the album text string language are the same;

determining that the title text string language is not speakable in the default language; and generating the speech content using the title text string language.

32. The method of claim 29, further comprising:

determining that the artist text string language and the default language are the same;

determining that the title text string language is speakable in the default language; and generating the speech content using the default language.

33. The method of claim 29, further comprising:

determining that the artist text string language is speakable in the title text string language; and generating the speech content using the title text string language.

34. The method of claim 29, further comprising:

determining that the artist text string language is not speakable in the title text string language;

determining that the artist text string language and the title text string language are speakable in the default language; and generating the speech content using the default language.

35. The method of claim 29, further comprising:

determining that the artist text string language is not speakable in the title text string language;

determining that speech content generated using the title text string language for the artist text string generates an audible output; and generating the speech content using the title text string language.

36. The method of claim 29, further comprising:

determining that the artist text string language is not speakable in the title text string language;

determining that speech content generated using the title text string language for the artist text string does not generate an audible output; and generating the speech content using an arbitrary language.

37. The Computer readable media for providing speech content, the computer readable media comprising computer readable instructions recorded thereon for:

receiving a set of text strings for which speech content is requested;

receiving a default language associated with the electronic device;

identify a title text string from the received set of text strings, wherein the title text string is associated with a title text string language;

identify an artist text string from the received set of text strings, wherein the artist text string is associated with an artist text string language;

determine that at least two of the title text string language, album text string language, and default language are different; and select one of the title text string language, album text string language, and default language for generating speech content for the title text string and album text string.

38. The computer readable media of claim 37, further comprising instructions for:

determining that the title text string language and the album text string language are the same;

determining that the title text string language is speakable in the default language; and generating the speech content using the default language.

39. The computer readable media of claim 37, further comprising instructions for:

determining that the title text string language and the album text string language are the same;

determining that the title text string language is not speakable in the default language; and generating the speech content using the title text string language.

40. The computer readable media of claim 37, further comprising instructions for:

determining that the artist text string language and the default language are the same;

determining that the title text string language is speakable in the default language; and generating the speech content using the default language.

41. The computer readable media of claim 37, further comprising instructions for:

determining that the artist text string language is speakable in the title text string language; and generating the speech content using the title text string language.

42. The computer readable media of claim 37, further comprising instructions for:

determining that the artist text string language is not speakable in the title text string language;

determining that the artist text string language and the title text string language are speakable in the default language; and generating the speech content using the default language.

43. The computer readable media of claim 37, further comprising instructions for:

determining that the artist text string language is not speakable in the title text string language;

determining that speech content generated using the title text string language for the artist text string generates an audible output; and generating the speech content using the title text string language.

44. The computer readable media of claim 37, further comprising instructions for:

determining that the artist text string language is not speakable in the title text string language;

determining that speech content generated using the title text string language for the artist text string does not generate an audible output; and generating the speech content using an arbitrary language.

45. A method for generating speech content for a plurality of text strings, the method implemented by at least one computing device having at least one processor and at least one program stored in memory, the method comprising:

identifying a plurality of text strings;

assigning a rank to each of the plurality of text strings;

detecting that a language of a lower rank text string and a higher rank text string are different;

determining that the language of the lower rank text string is speakable in the language of the higher rank text string; and generating speech content for at least the lower rank text string and the higher rank text string using the language of the higher rank text string.

46. The method of claim 45, wherein:

the low priority text string comprises an artist name; and the high priority text string comprises at least one of a track name and an album name.

47. The method of claim 45, further comprising:

identifying a default language associated with a personal electronic device providing the speech content;

determining that the languages of the lower rank text string and the higher rank text string are speakable in the default language; and generating speech content for the lower rank text string and the higher rank text string using the default language.

48. The method of claim 47, wherein:

the language of at least one of the lower rank text string and higher rank text string is the default language.

49. An electronic device having at least one processor and memory storing at least one program for execution by the at least one processor, the at least one program including instructions for:

identifying a plurality of text strings;

assigning a rank to each of the plurality of text strings;

detecting that a language of a lower rank text string and a higher rank text string are different;

determining that the language of the lower rank text string is speakable in the language of the higher rank text string; and generating speech content for at least the lower rank text string and the higher rank text string using the language of the higher rank text string.

50. The electronic device of claim 49, wherein:

the low priority text string comprises an artist name; and the high priority text string comprises at least one of a track name and an album name.

51. The electronic device of claim 49, the at least one program further comprising instructions for:

identifying a default language associated with a personal electronic device providing the speech content;

determining that the languages of the lower rank text string and the higher rank text string are speakable in the default language; and generating speech content for the lower rank text string and the higher rank text string using the default language.

52. The electronic device of claim 51, wherein:

the language of at least one of the lower rank text string and higher rank text string is the default language.

53. The Computer readable media for generating speech content for a plurality of text strings, the computer readable media comprising computer readable instructions recorded thereon for:

identifying a plurality of text strings;

assigning a rank to each of the plurality of text strings;

detecting that a language of a lower rank text string and a higher rank text string are different;

determining that the language of the lower rank text string is speakable in the language of the higher rank text string; and generating speech content for at least the lower rank text string and the higher rank text string using the language of the higher rank text string.

54. The computer readable media of claim 53, wherein:

the low priority text string comprises an artist name; and the high priority text string comprises at least one of a track name and an album name.

55. The computer readable media of claim 53, further comprising instructions for:

identifying a default language associated with a personal electronic device providing the speech content;

determining that the languages of the lower rank text string and the higher rank text string are speakable in the default language; and generating speech content for the lower rank text string and the higher rank text string using the default language.

56. The computer readable media of claim 55, wherein:

the language of at least one of the lower rank text string and higher rank text string is the default language.

* * * * *